ROUTE SWITCHING SYSTEMS

Filed Sept. 13, 1967 8 Sheets-Sheet 1

N ⟷ R

INVENTORS
ROBERT B. McCUNE
ROSSER L. WILSON
BY Wallace, Kinzer & Dorn
Attys.

Nov. 25, 1969 R. B. McCUNE ET AL 3,480,773

ROUTE SWITCHING SYSTEMS

Filed Sept. 13, 1967 8 Sheets-Sheet 2

INVENTORS
ROBERT B. Mc CUNE
ROSSER L. WILSON

BY

Wallace, Kinzer & Dorn
Attys

Nov. 25, 1969 R. B. McCUNE ET AL 3,480,773

ROUTE SWITCHING SYSTEMS

Filed Sept. 13, 1967 8 Sheets-Sheet 3

INVENTORS
ROBERT B. McCUNE
ROSSER L. WILSON

BY Wallace, Kinzer & Dorn
Att'ys

Nov. 25, 1969 R. B. McCUNE ET AL 3,480,773

ROUTE SWITCHING SYSTEMS

Filed Sept. 13, 1967 8 Sheets-Sheet 4

INVENTORS.
ROBERT B. McCUNE
ROSSER L. WILSON
BY Wallace, Kinzer & Dorn
Attys

INVENTORS.
ROBERT B. Mc CUNE
ROSSER L. WILSON
BY Wallace, Kinzer & Dorn
ATTYS.

ROUTE SWITCHING SYSTEMS

INVENTORS
ROBERT B. McCUNE
ROSSER L. WILSON
BY Wallace, Kinzer & Dorn

INVENTORS.
ROBERT B. McCUNE
ROSSER L. WILSON
BY Wallace, Kinzer & Dorn
ATTYS.

RELAY SEQUENCE, PASSAGE OF SINGLE CUT

RELAY SEQUENCE, PASSAGE OF TWO CUTS, SECOND CUT ENTERING WHILE FIRST CUT IS BETWEEN SWITCHES 1-5 AND 2-5

INVENTORS
ROBERT B. McCUNE
ROSSER L. WILSON
BY Wallace, Kinzer & Dorn
ATTYS 3,480,773
ROUTE SWITCHING SYSTEMS
Robert B. McCune, Allendale, and Rosser L. Wilson, Mahwah, N.J., assignors to Abex Corporation, New York, N.Y., a corporation of Delaware
Filed Sept. 13, 1967, Ser. No. 667,504
Int. Cl. B61l 27/04; B61b 1/00
U.S. Cl. 246—4 12 Claims

ABSTRACT OF THE DISCLOSURE

An automatic route switching system for a railroad classification yard, including a main control and storage unit for recording a number of different route command signals and a transmission system for simultaneously transmitting the pertinent parts of each route command to each of a plurality of individual track switch control units. These control units each afford local storage for several partial route commands, and each actuates its associated track switch in accordance with the partial route commands and in accordance with traffic conditions at the track switch.

This invention relates to a new and improved automatic route switching system for use in the control of railroad classification yards and in like applications.

In railroad classification yards, and particularly large yards having a substantial number of individual classification tracks, automatic route switching equipment has been applied to control the passage of the individual cuts of cars through the yards. In any such yard, the switch machines used for diverting cuts of railroad cars along the many different routes available in the yard to their final destinations are all electrically actuated by the switching system. The switching system is continuously provided with information about the position of various cuts moving through the yard by means of track occupancy circuits associated with the various switches. In one such system, a series of route commands are first recorded at a main control unit by a yard operator. As each cut passes through the first switch in the yard, the routing information regarding that cut is transferred to a separate control unit associated with the next switch downstream in the yard. When the cut clears the downstream switch, the routing information is again transferred on to the next switch in sequence, and so on until the final switch is cleared. Thus, the information transfer is entirely sequential and information regarding a cut is applied to the part of the control system relating to a given switch machine only when the cut approaches that machine.

It is an object of the present invention to afford a new and improved automatic route switching system for railroad classification yards and like applications that affords increased reliability and flexibility of operation in comparison with previously known route switching apparatus.

A particular object of the invention is to afford a new and improved automatic route switching system that may be constructed with modular control units, one for each switch machine in the classification yard, by reducing the storage requirements for each control unit to the information pertaining solely to the switch machine that it controls. A corollary object of the invention is to eliminate any necessity for sequential storage of full route command information, in an automatic switching system for a railroad classification yard, by providing for simultaneous transmission of partial route command information to individual modular control units for all of the switch machines along a given route.

Another object of the invention is to avoid duplication of storage functions in the individual control units for the switch machines of a railroad classification yard controlled by an automatic route switching system.

An additional object of the invention is to provide a new and improved automatic route switching system, for railroad classification yards and like applications, capable of effective control under virtually all potential operating circumstances in the yard and capable of handling a maximum amount of traffic at minimum cost.

It is a specific object of the invention to provide an automatic route switching system in which virtually all of the principal control units are modular units substantially identical to each other, thereby simplifying maintenance and reducing overall cost of manufacture.

Accordingly, the present invention is directed to an automatic route switching system for a railroad classification yard of the like including a plurality of switch machines for diverting vehicles along a series of routes diverging from the first switch machine in the yard to specified destinations. The term "vehicles" as used in this context and throughout the specification and claims may include an individual railroad car or a series of cars coupled together and forming a cut. The switching system constructed in accordance with the invention comprises a main control unit including main storage means for recording a number of complete route commands identifying individual routes to be traversed by the vehicles, together with readout means for reading out the stored route commands in sequence. A plurality of modular control units of essentially similar construction are provided, one for each switch machine; these modular control units control operation of each switch machine in accordance with partial route commands relating to the controlled switch machine and also in accordance with the traffic conditions on a route section encompassing the controlled switch machine and the immediately preceding switch machine. Each of the modular control units includes local storage means for recording sevaral partial route commands, but the control units are not required to store route command information with respect to any other switch machine. The system further includes transmission means coupling the readout means of the main control unit to each of the modular control units; this transmission means simultaneously transmits partial route commands from the main control unit to all of the modular units affected by a given complete route command.

Other and further objects of the present invention will be apparent from the following description and claims and are illustrated in the accompanying drawing which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

Figure 9:
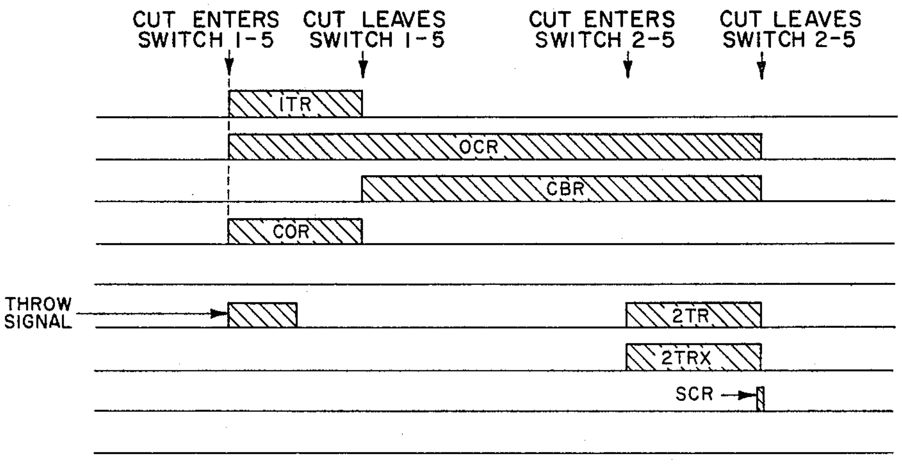
Figure 10:
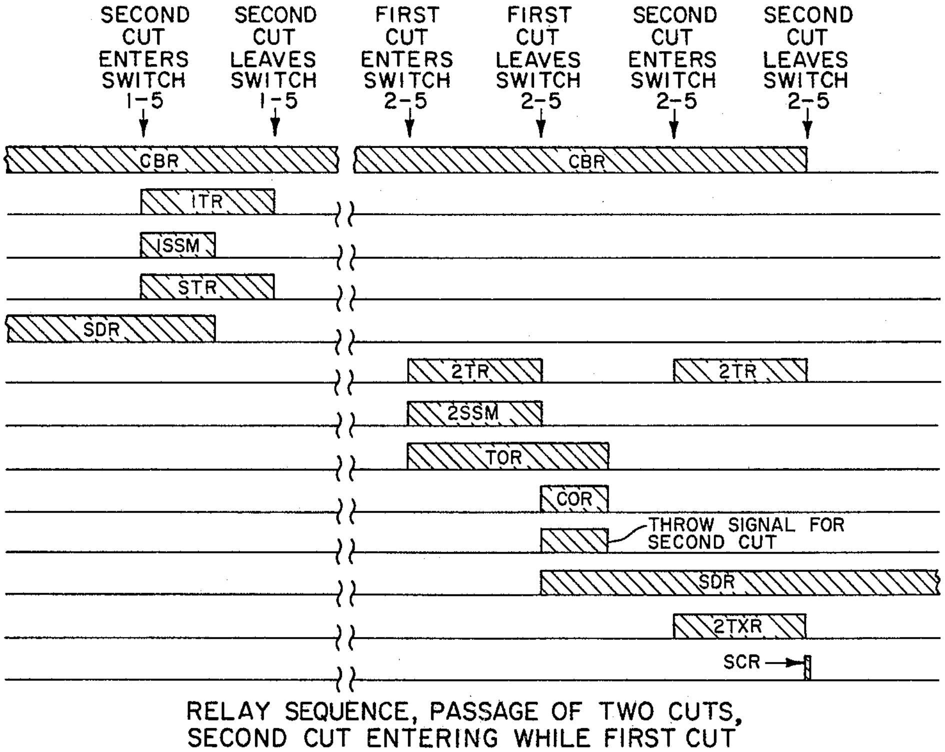

FIG. 9 is a chart illustrating the timing of operation of certain circuit components of a modular control unit for passage of a single cut through the route section governed by the modular control unit; and FIG. 10 is a timing chart for circuit components in the modular control unit for passage of two cuts through the route section where the second cut enters while the first cut is still present in the route section.

GENERAL DESCRIPTION, FIGS. 1 THROUGH 3

Figure 1:
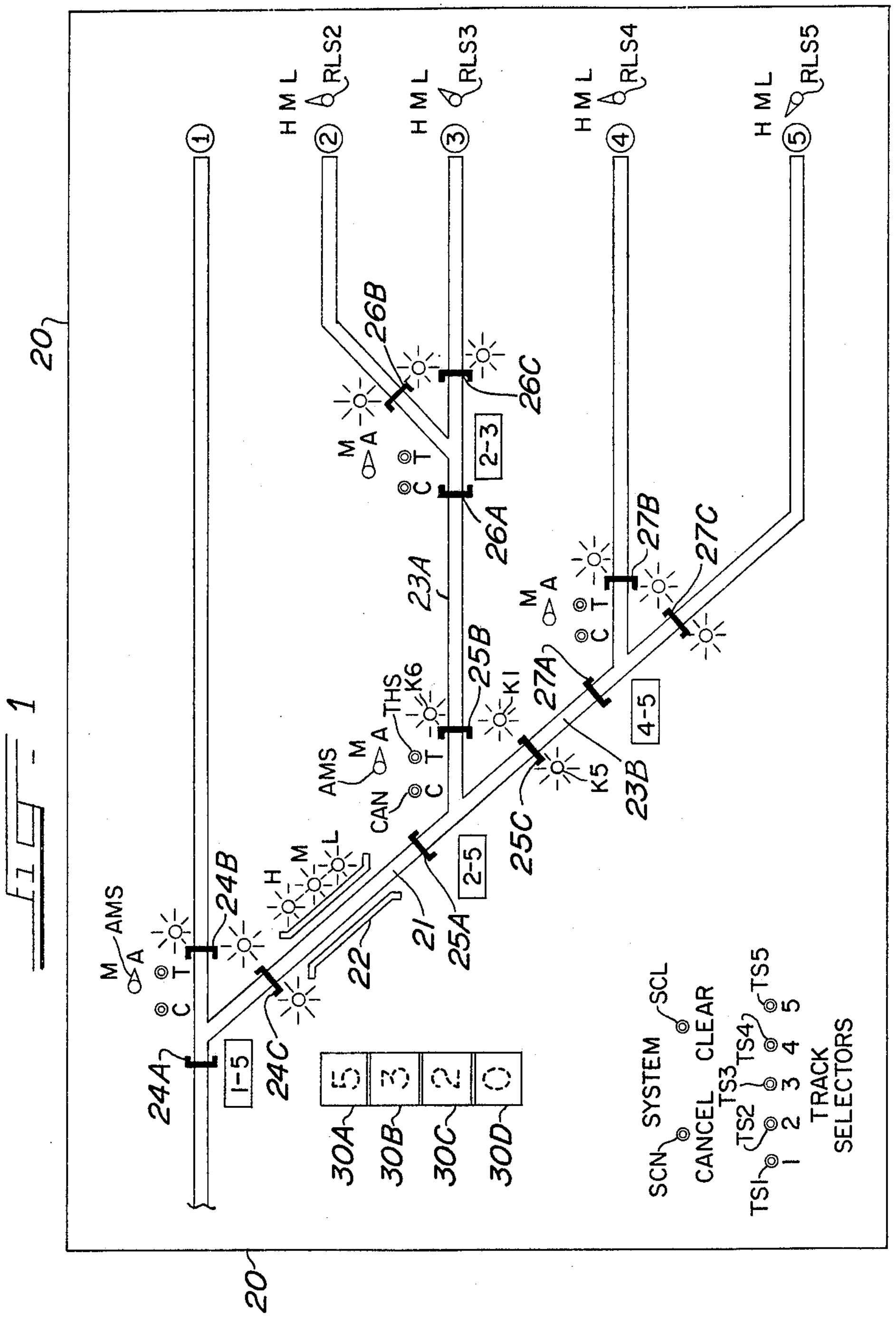
FIG. 1 is a plan view of an operator's control console for an automatic route switching system constructed in accordance with one embodiment of the present invention.
Figure 2:
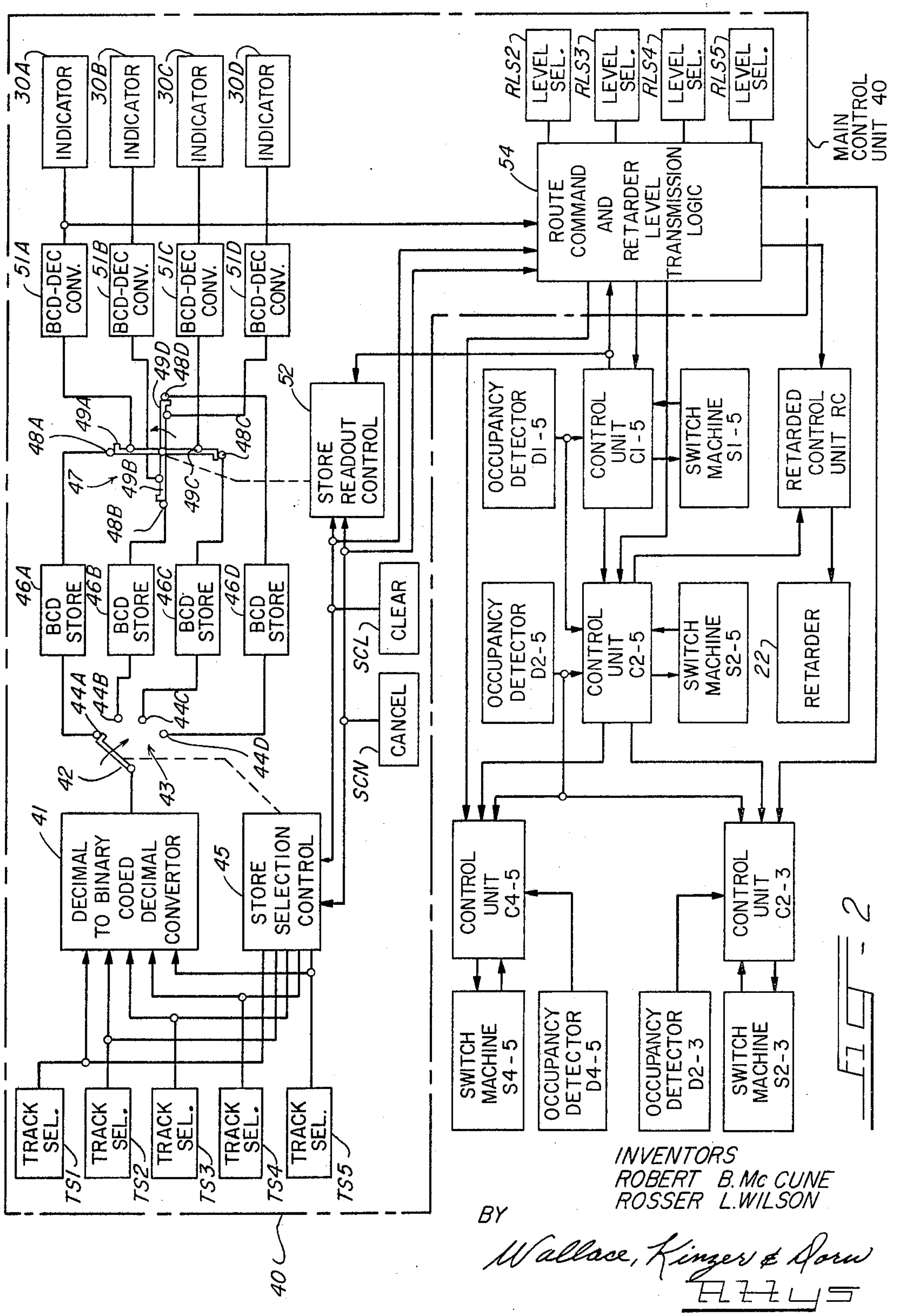
FIG. 2 is a partially schematic functional block diagram of an automatic route switching system constructed in accordance with one embodiment of the present invention, the main control unit of the system being shown in substantial detail.
Figure 3:
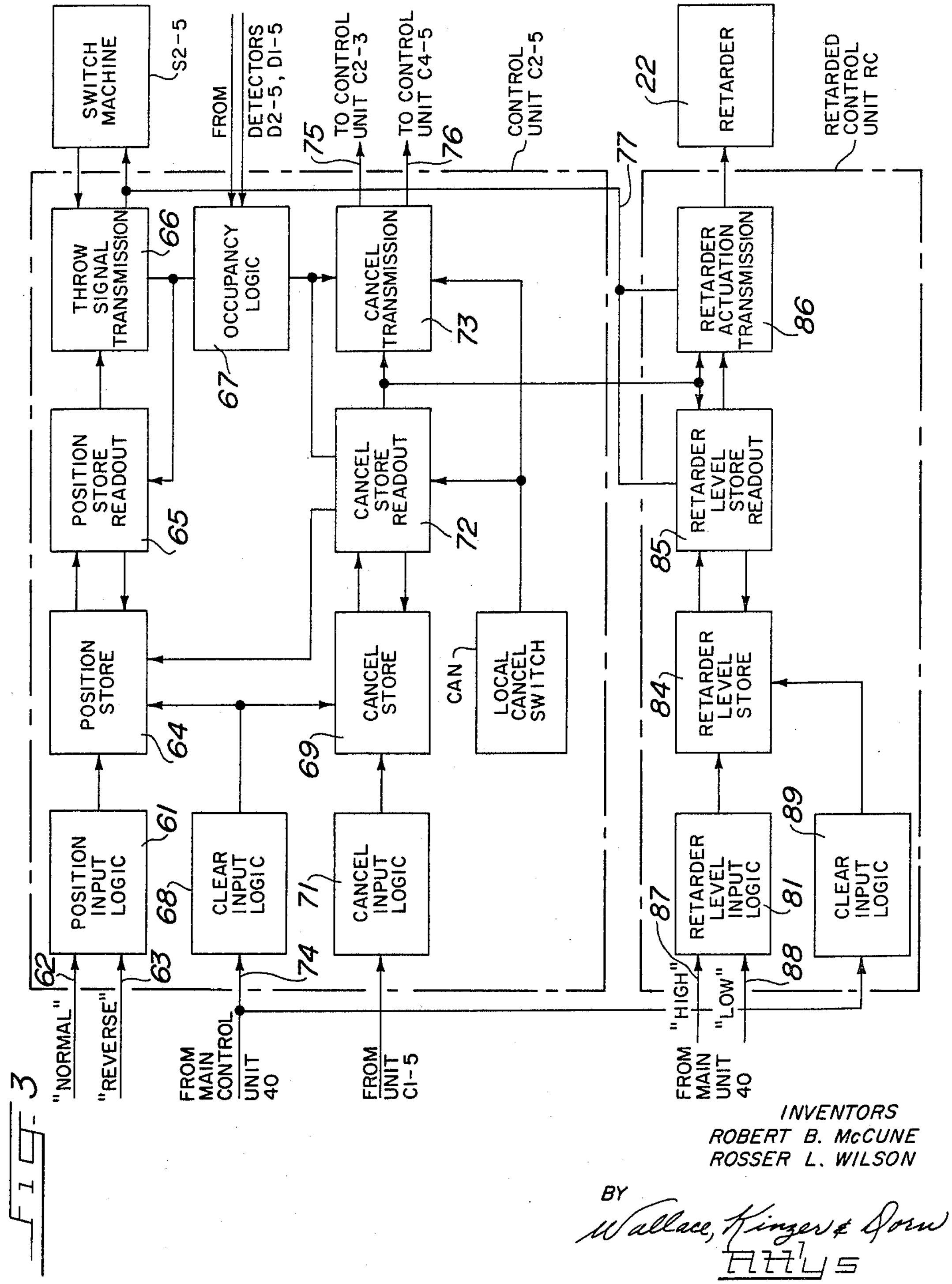
FIG. 3 is a functional block diagram of one modular control unit incorporated in the system illustrated in FIG. 2, together with a retarder control unit employed in that system.

The general construction and organization of one embodiment of the automatic route switching system of the present invention can best be understood by reference to FIGS. 1 through 3. FIG. 1 is a plan view of an operator's control console 20 from which the system is controlled in ordinary operation. The console 20 includes, on its upper surface, an outline representation of the railroad classification yard controlled by the route switching system. This classification yard includes a main track identified as track 1 on the console and extending horizontally across the upper part of the console. The classification yard includes a series of classification tracks that are reached by a series of diverging routes from a first switch 1–5. The yard controlled by console 20 is a relatively simple classification yard and includes only four classification or destination tracks identified as tracks 2, 3, 4 and 5 on the console.

The branch track 21 extending downwardly at an angle from track 1 on the lower leg of switch 1–5 includes, in its medial portion, a representation of a car retarder 22. Track section 21 extends into an additional switch 2–5 which branches into track sections 23A and 23B. Track section 23A extends to an additional switch 2–3 that leads to classification tracks 2 and 3. Track section 23B leads to a switch 4–5. Switch 4–5 branches to classification tracks 4 and 5. The switch identification numbers 1–5 through 4–5 are those conventionally employed in automatic route switching systems, the initial numeral of the switch designation identifying the lowest-numbered track to which the switch may route vehicles and the second digit of the identification numeral indicating the highest-numbered track.

In the railroad classification yard controlled from console 20, there is an occupancy detection apparatus D1–5 (see FIG. 2) associated with switch 1–5 and is employed to detect entry of a cut into the switch and departure of the cut from the switch. The extent of the occupancy detection track circuit is indicated on the console by the terminal markings 24A, 24B and 24C. A similar track occupancy detection circuit is provided for switch 2–5 and covers a portion of the track system identified by the markings 25A, 25B and 25C on console 20. For switch 2–3, the extent of the track occupancy detection circuit is indicated on the console by the indicia 26A, 26B, and 26C, the limits of the track occupancy detection circuit for switch 4–5 are at 27A, 27B and 27C.

Control console 20 includes a number of switches, system actuators, and indicator lamps that are employed to keep the operator informed as to traffic conditions in the system and that enable him to control the routing of individual railroad cars or cuts of cars through the yard. For each of the track switches 1–5, 2–5, 2–3, and 4–5, there is an electrical control switch AMS for switching the control system between automatic and manual operation. On console 20, as illustrated in FIG. 1, each of these switches AMS is aligned in its "automatic" position and this is the normal operating situation with respect to all of these switches. The "manual" position for the AMS switches is utilized only for certain limited conditions and for emergency purposes.

On console 20, at each of the individual switch locations, there is a cancel switch CAN. Alongside the cancel switch, at each switch location on the console, there is a throw switch THS. The functions of these switches are described in detail hereinafter.

Associated with switch 2–5, as represented on console 20, there is an indicator lamp K1. In operation of the automatic route switching system, lamp K1 is energized whenever a railroad vehicle is present in the detector circuit for track switch 2–5, as defined by the limitation indicia 25A–25C. Track switch 2–5, as illustrated on the surface of console 20, also has two additional indicator lamps K5 and K6 associated with it. Lamp K5, when energized, indicates that switch 2–5 is thrown in a direction to route railroad cars downwardly along track section 23B. Using conventional terminology, lamp K5, when lit, indicates that switch 2–5 is in its "reverse" position. Lamp K6, on the other hand, is energized when the switch is in its opposite operating position, known conventionally as the "normal" position, and would route cars along track section 23A. Each of the other switches, as represented on console 20, are provided with similar position and occupancy indicator lamps.

The automatic switching system of the present invention may incorporate provision for controlling action of the retarder 22 as well as the operations of the switches in the classification yard. For retarder control, a series of retarder level switches RLS are located along the right-hand side of the console 20, there being one retarder level switch for each of the classification tracks 2, 3, 4 and 5. In the illustrated embodiment, each of the retarder level switches has three settings for obtaining high, medium, and low release speeds from retarder 22.

At the left-hand side of console 20, there are a series of track selector switches labelled, on the console, with numbers corresponding to individual tracks in the yard. The track selector switches TS1 through TS5 are employed by the operator to enter route commands into the automatic switching system to control the movements of vehicles through the classification yard. Immediately above the track selector switches are located a system cancel switch SCN and a system clear switch SCL. The cancel switch SCN is utilized to cancel erroneous track selection switch operations; that is, route commands incorrectly entered by operation of the track selectors TS1–TS5 may be individually cancelled by operation of switch SCN. System clear switch SCL, on the other hand, is utilized to clear all previously recorded route command data from the automatic switching system.

To enable the operator to check the route commands entered in the system, and to keep the operator advised as to route commands that have already been entered, a plurality of indicator devices 30A, 30B, 30C, and 30D are mounted in console 20 near the left-hand side thereof. In the construction illustrated in FIG. 1, each of the indicator devices 30A–30D may constitute a multiple-filament lamp capable of indicating any number from 0 through 9, depending upon which of ten terminals of the lamp is energized. The present invention is not dependent upon this particular form of indicator. Since these and equivalent indicators are well known in the art, no specific description is provided with respect to construction and operation of the indicators.

FIG. 2 illustrates, in partially schematic block diagram form, the basic construction and organization of the automatic route switching system of the present invention. As shown therein, the system comprises a main control unit 40; this main control unit includes a number of the operating components of console 20. In the main control unit 40, the track selector switches TS1–TS5 are shown individually coupled to a decimal-to-binary-coded-decimal converter circuit 41. Converter circuit 41 has an output coupled to the wiper arm 42 of a rotary stepping switch 43 having four individual output terminals 44A, 44B, 44C, and 44D. The construction of stepping switch 43 is such that wiper arm 42 moves step-by-step from terminal 44A to terminal 44D and then directly from terminal 44D back to terminal 44A.

Main control unit 40 further includes a route command storage selection control unit 45 that is electrically connected to each of the track selector switches TS1 through TS5. Control circuit 45 is utilized to actuate stepping switch 43 in accordance with a control cycle described hereinafter.

In accordance with the present invention, main control unit 40 is provided with a main storage means for recording a number of complete route commands identifying individual routes to be traversed by vehicles in the classification yard controlled by the system. The main storage means, in the embodiment of FIG. 2, comprises four binary coded decimal storage circuits 46A, 46B, 46C and 46D having input circuits individually connected to terminals 44A, 44B, 44C and 44D, respectively, of stepping switch 43. Each of storage circuits 46A–46D comprises a multiple stage storage register capable of storing a complete route command in binary coded decimal form. The individual storage circuits may comprise banks of relays, magnetic core storage devices, thyratron storage devices, bi-stable trigger circuits constructed with vacuum tube or solid stage operating elements, or virtually any other form of storage device. Inasmuch as appropriate and effective storage devices are well known in the art, no specific form of storage apparatus need be described in detail herein.

Main control unit 40 also includes appropriate readout means for reading out the stored route commands, in sequence, from storage registers 46A–46D. The readout means, in the embodiment illustrated in FIG. 2, includes a rotary stepping switch 47 having four fixed terminals 48A, 48B, 48C and 48D that are connected to the output circuits of storage circuits 46A, 46B, 46C and 46D respectively. Stepping switch 47 is provided with four individual wiper arms 49A, 49B, 49C and 49D. Wiper arms 49A through 49D are electrically insulated from each other. Arm 49A is electrically connected, by a slip ring or other appropriate means, to a converter circuit 51A for converting route command information from binary coded decimal to decimal form. Similar converter circuits 51B, 51C, and 51D are electrically connected to wiper arms 49B, 49C, and 49D, respectively, of stepping switch 47. Converter circuits 51A–51D, and particularly circuit 51A, constitute an integral part of the readout means for reading out the stored route commands from registers 46A–46D.

Stepping switch 47 is actuated by a storage readout control circuit 52, the operation of which is described more fully hereinafter. The two stepping switch control circuits 45 and 52 are each electrically connected to the system cancel switch SCN that is a part of the operator's console (see FIG. 1). Similarly, as shown in FIG. 2, the system clear switch SCL on the operator's console is electrically connected to each of the two stepping switch control circuits.

Converter circuits 51A through 51D are individually electrically connected to the indicator devices 30A through 30D. Converter 51A is also coupled to a destination and retarder level transmission logic circuit 54. Circuit 54 comprises a transmission means for coupling the readout circuit of the route command storage to each of a plurality of modular control units C1–5, C2–5, C2–3 and C4–5 for simultaneous transmission of partial route commands from main control unit 40 to all of the modular control units that are affected by each given complete route command. Transmission circuit 54 is also individually electrically connected to each of the retarder level selector switches RLS2 through RLS5. Furthermore, the transmission circuit is connected to the cancel switch SCN and the clear switch SCL to provide for transmission of system clearing and route command cancellation information to the modular control units of the system.

As shown in FIG. 2, the modular control unit C1–5 is electrically connected to a switch machine S1–5, this being the operating machine for the switch 1–5 at the entrance end of the classification yard (FIG. 1). A dual electrical connection is shown in the drawing, between control unit C1–5 and switch machine S1–5, since it is necessary for the control unit to supply a throw signal to actuate the switch machine when required and it is also necessary for the switch machine to provide information with respect to its present position to the control unit in order to avoid unnecessary throw operations. Control unit C1–5 is also electrically connected to an occupancy detector D1–5. Detector D1–5 detects the entrance and exit of railway vehicles into the track circuit encompassing switch 1–5 and defined by limits 24A–24C on the operator's console 20 (FIG. 1). A variety of different forms of occupancy detector can be used effectively with the present invention; accordingly, no specific form of detector circuit is described in detail herein. This is equally true with respect to switch machine S1–5, which may be electrically, hydraulically, pneumatically, or mechanically actuated, as long as actuation can be triggered by an appropriate electrical signal from control unit C1–5.

Control unit C2–5 (FIG. 2), in addition to its input connection from transmission circuit 54, is provided with input circuits coupled to occupancy detector D1–5 and to an additional occupancy detector D2–5. Occupancy detector D2–5 is utilized to determine the entrance and exit of railway vehicles in the track circuit defined by limits 25A–25C on the operator's console (FIG. 1). As shown in FIG. 2, control unit C2–5 is also provided with input and output connections to the switch machine S2–5 for operating the second track switch 2–5 in the classification yard.

The modular control units C4–5 and C2–3 are provided with input and output connections to switch machine S4–5 and S2–3, respectively. Occupancy detector D2–5 is connected to each of these two control units. Control unit C4–5 is also connected to an additional occupancy detector circuit D4–5 that produces signals indicative of entrance and exit of a vehicle with respect to the track detection circuit defined by limits 27A–27C on the operator's console. A similar occupancy detector D2–3, related to detector circuit limits 26A–26C, is coupled to control unit C2–3.

Modular control units C1–5 through C4–5 are all essentially similar to each other. However, certain external connections may vary for the modular control units, depending upon their position in the automatic route switching system. Thus, modular control unit C1–5 is provided with an output circuit coupled back to transmission circuit 54 and to readout control circuit 52 in the main control unit 40. Control unit C2–5, on the other hand, is provided with a supplemental output connection to a retarder control unit RC. The retarder control unit RC is also provided with an input connection from transmission circuit 54 and an output circuit coupling the retarder control unit to retarder 22.

FIG. 3 is a schematic functional block diagram of one of the modular control units of the automatic route switching system, and specifically the modular control unit C2–5 for controlling the second switch machine S2–5 of the system. As illustrated in FIG. 3, control unit C2–5 comprises a route command input logic circuit 61 having two inputs. The first input circuit 62 carries an input signal for route commands which require actuation of switch machine S2–5 to its "normal" position in which switch 2–5 diverts a railroad vehicle or cut of vehicles onto track section 21 (see FIG. 1). The other input 63 for logic circuit 61 is energized by an input signal to indicate a route command requiring actuation of switch 2–5 to its "reverse" position to divert traffic to rail section 23. Both of the circuit connections 62 and 63 are derived from the destination and retarder level transmission logic circuit 54 in main control unit 40 (FIG. 2).

The route command input logic circuit 61 has an output coupled to a local storage means 64 for recording a plurality of partial route commands relating to operation of the switch machine S2–5 that is controlled by modular control unit C2–5. The capacity required for route command storage means 64 depends in part upon the length of the classification yard and the number of vehicles or vehicular cuts that are likely to be upstream of switch machine S2–5 at any given time. In a relatively small and simple classification yard such as that illustrated and described above in connection with the console 20 of FIG. 1, the capacity of route command store 64 may be relatively small. In the specific example set forth hereinafter, the route command store has a capacity of just five partial route commands.

The local route command storage unit 64 is coupled to a readout circuit 65. Readout circuit 65 in turn, is coupled to a throw signal transmission circuit 66 that includes an output connection direct to switch machine S2–5 to throw the switch machine from one operating position to the other. In addition, there is a return connection from switch machine S2–5 to transmission circuit 66 to enable the transmission circuit to control its own operations in relation to the present position of the switch machine and thereby avoid extraneous and unnecessary actuation of the switch machine.

The timing of actuation of switch machine S2–5 is frequently dependent upon traffic conditions in the rail section encompassing switches 1–5 and 2–5; that is, changes in traffic conditions may require delay of transmission of a throw signal to switch machine S2–5. Consequently, the throw signal transmission circuit is provided with traffic condition information by means of an input connection from an occupancy logic circuit 67 that is connected to both of the occupancy detectors D1–5 and D2–5 (see FIG. 2). Occupancy logic circuit 67 is also connected to the route command readout circuit 65 to control operations of the readout circuit and, indirectly, of the route command storage means 64.

Cancellation and correction of erroneous routing information and clearing of the system are necessary functions carried out, in part, in modular control unit C2–5. Clearing signals from main control unit 40 are first applied to a clear input logic circuit 68 in the modular control unit. The output of logic circuit 68, which is utilized to delay clearing operations under certain traffic conditions, is coupled both to the route command store 64 and to a cancel storage means 69. Cancel store 69, which may be quite similar in construction to route command store 64 as described more fully hereinafter, is also provided with route command cancellation signals from the preceding modular control unit C1–5, the latter signals being coupled to the cancellation storage unit through a cancel input logic circuit 71.

The cancel store unit 69 is provided with a readout circuit 72. Readout circuit 72 is in actuality an integrated part of the storage unit but has been separated therefrom in the block diagram to simplify explanation of the operation of the circuit. Functioning of the cancel storage readout circuit 72, like the route command store readout 65, must be timed in accordance with traffic conditions along the controlled rail section encompassing switches 1–5 and 2–5. Accordingly, an input to readout circuit 72 is provided from occupancy logic circuit 67. The cancel store readout circuit 72 is provided with one output connection to the route command store 64. A further output from the cancel store readout goes to a cancel transmission circuit 73 that includes separate output connections 75 and 76 to modular control units C2–3 and C4–5. In part, operation of cancel transmission circuit 73 is controlled by an input signal connection from occupancy logic circuit 67. In addition to the remote cancel signals from unit C1–5, the cancellation of route command data in modular control unit C2–5 may also be controlled by the local cancel switch CAN, which is connected both to the cancel store readout circuit 72 and the cancellation transmission circuit 73.

FIG. 3 also affords a functional block diagram of the retarder control unit RC, which in many respects is substantially similar to the upper half of modular control unit C2–5. Thus, the retarder control unit includes a retarder level input logic circuit 81 having individual input lines from main control unit 40 for the reception of signals representative of a high release speed for the retarder and a low release speed for the retarder. This dual input signal arrangement also permits control for a medium release speed, signals on individual lines being used for high and low release speed conditions, and simultaneous signals on both lines signifying a medium release speed.

The output of the retarder level input logic 81 is coupled to a retarder level storage means 84 which is in turn coupled to a readout circuit 85. The output of the readout circuit 85 is coupled to a retarder actuation transmission circuit 86. For cancellation of information in the retarder storage unit and for inhibition of transmission of certain level-of-operation information to the retarder, a connection is provided to circuits 85 and 86 from the output of the cancel store readout circuit 72 in control unit C2–5. This arrangement is utilized because there is no separate track occupancy detector circuit associated with the retarder, control of the retarder being dependent primarily upon occupancy information derived for the control of switch 2–5 by control unit C2–5. Transmission circuit 86 is coupled to retarder 82 to control the braking level of the retarder.

The retarder control unit RC further includes provision for clearing previously recorded retarder level information from storage means 84. Thus, it comprises a clear input logic circuit 87 that is coupled to the same circuit in main control unit 40 that provides system clearing signals to control unit C2–5. The clear input logic circuit 87 is coupled to the retarder level storage means 84.

GENERAL OPERATION, FIGS. 1 THROUGH 3

In considering the operation of the route switching system, based upon FIGS. 1–3, it may first be assumed that the system is clear of all railroad vehicles and is also clear of all recorded information pertaining to vehicle routing. At the outset, the operator should set the retarder levels for tracks 2 through 5, adjusting switches RLS2 through RLS5 in accordance with the lengths and slopes of the tracks, prevalent weather conditions, and other related factors. In FIG. 1, this adjustment is shown as providing for a high speed release for track 5, medium speed release for tracks 2 and 4, and low speed release for track 3. It may prove necessary to adjust the retarder level settings on a day-to-day basis and even in the course of a day's operation, depending upon operating conditions at the classification yard.

With the retarder level settings established, the yard is ready for operation. When the first cut of cars is released or ready to be released from the hump, which would be located to the left of switch 1–5 as seen in FIG. 1, the operator actuates the particular track selector identifying the classification track to which that first cut should be directed. Assuming that the first cut of cars is destined for classification track 5, the operator actuates track selector switch TS5 (FIGS. 1 and 2). In the main control unit 40, actuation of switch TS5 causes the converter circuit 41 to produce a coded signal, identifying track 5, that is recorded in the first BCD store unit 46A. When the operator subsequently releases track selector switch TS5, storage selection control unit 45 is actuated and causes stepping switch 43 to advance one step from terminal 44A to terminal 44B. It should be recognized that the stepping switch would actually include several levels to transmit plural signals from converter circuit 41 to the BCD storage units in each operation.

Starting from the system clear condition illustrated in FIG. 2, it is seen that BCD storage unit 46A, which now contains the recorded route command "five," is coupled to converter circuit 51A. Thus, indicator lamp 30A is energized and gives a visual indication of the route command. The same route command information is supplied to the destination and retarder level logic transmission circuit 54. There being no vehicles present in the classification yard as yet, the route command "five" is immediately translated into a series of partial route commands, one for each of the control units C1–5 through C4–5, and these partial route commands are transmitted simultaneously and directly to the individual control units. Note that no route command is transmitted to control unit C2–3, since switch 2–3 does not participate in routing a cut to track 5. Furthermore, the transmission circuit signals retarder control unit RC for a high speed release operation, since the retarder level selector RLS5 is set for this level of operation (see FIG. 1).

Frequently, the operator will wish to record route commands for a series of cuts rather than waiting until each cut approaches tracks 1–5. Thus, if the second cut is to go to track 3, the operator may actuate selector switch TS3 immediately after he has actuated TS5 as above.

The route command for track 3 is converted to binary coded decimal form in converter circuit 41 (FIG. 2) and is recorded in BCD store 46B, since stepping switch 43 has advanced to engage wiper 42 with terminal 44B. The recorded information is displayed on indicator 30B through the connection of converter circuit 51B linking indicator 30B with BCD store 46B through the stepping switch 47, which has not as yet changed its position.

After actuation of switch TS3 to record the second route command, release of the selector switch TS3 causes storage selection control circuit 45 to actuate stepping switch 43, advancing the stepping switch to bring the wiper 42 to terminal 44C. The operator can now record an additional route command in the system. Assuming that the destination for the next cut is classification track 2, the operator actuates track selector TS2 and this route command is recorded in BCD store 46C and indicated on indicator 30C. At this point, the operator may decide that sufficient route command information has been entered in the system, with the result that the bank of indicator lamps 30A–30D shows the information indicated in FIG. 1.

During entry of the route command information as described above, it has been assumed that the initial cut is still approaching the system and has not yet entered switch 1–5. When the first cut enters switch 1–5, the switch has already been thrown to the "reverse" position necessary to route the cut onto track section 21 leading toward the classification track and specifically toward classification track 5, the destination of the first cut. The first cut passes through switch 1–5 and enters retarder 22, adjusted for a retarding level that wil produce a high release speed as indicated above.

As soon as the first cut clears switch 1–5 by passing beyond the exit limit 24C for the detector track circuit D1–5 encompassing switch 1–5, a control signal is supplied from occupancy detector D1–5 through modular control unit C1–5 to the storage readout control unit 52 and to the route command transmission logic circuit 54. As a consequence, stepping switch 47 is advanced one step in a counterclockwise direction, changing all of the connections between the storage bank 46A–46D and the converter circuits 51A–51D, a change that also directly changes the connections from storage to indicators 30A–30D. Thus, at this point converter 51A and indicator 30A are connected through wiper arm 49A of stepping switch 47 to the switch terminal 48B and hence to BCD store 46B. Similarly, converter 51B and indicator device 30B are now electrically connected to BCD store 46C, and so on. Assuming no further route command information has been entered in the system, the indicator devices 30A–30D, reading from top to bottom as seen in FIG. 1, would now read "three," "two," "zero," "zero," indicating the storage of future route commands "three" and "two" with no additional route commands in the system.

With the change in the indicator and converter connections described above, transmission circuit 54 is again actuated to supply partial route commands to the modular control units identifying the destinations of the second cut, which is to be classification track 3. Control unit C1–5 is actuated immediately to its reverse position; in actuality, it simply stays in the reverse position in which it has already been established for routing of the previous cut. The partial route commands for controlling subsequent switches 2–5 and 2–3, required for routing of the second cut, are stored in the modular control units C2–5 and C2–3 for future use.

When the second cut has passed through switch 1–5, again signalled by occupancy detector D1–5 and transmitted through control unit C1–5 to the main control unit 40, the same operation takes place with respect to the third route command that had been recorded in the system, identifying the destination of the third cut as classification track 2. That is, stepping switch 47 is again advanced one step, connecting converter circuit 51A and indicator 30A through wiper arm 49A to the third BCD storage unit 46C, the connection being made through terminal 48C of stepping switch 47. A corresponding change is made in the connections for the remaining indicators 30B through 30D. At this point, and again assuming that no additional route information has been recorded in the system, the indicator lamps on the console 20 (FIG. 1) would read, from top to bottom, "two", "zero," "zero," "zero." Again, the route command information is transmitted to the modular control units affected thereby, by transmission circuit 54, as soon as the stepping of switch 47 is complete.

At any time during the foregoing operations, the operator can enter additional route command information in the system by actuation of the track selector switches TS1–TS5. Each time a route command is entered, it is stored in the next available BCD store unit 46A–46D, dependent upon the position of stepping switch 43. Stepping switch 47 advances the indicator connections in each stage of operation, as described above, so that the indicators always give the operator a direct reading on the route commands present in the system and not yet complete with respect to passage of a cut through the initial switch 1–5. Of course, pursuing the foregoing example a step further, when the third cut clears the track detection circuit encompassing switch 1–5, passing beyond the limit 24C, and a control signal is supplied to readout control 52 and transmission circuit 54 signifying this occurrence, stepping switch 47 advances a third step and comes into synchronism with stepping switch 43 if no additional information has been recorded in the system. Under these circumstances, the operator is made aware that the system is clear of all route command information because all of the indicators 30A through 30D show zeros.

Referring again to passage of the first cut through the classification yard, control unit C2–5 is thrown to its "reverse" position to route that cut onto track section 23B immediately upon receipt of the first partial route command signal from transmission circuit 54, there having been no cut present in the system. Switch 2–5 is held in this reverse position until the first cut enters the track circuit for the switch and subsequently leaves that track circuit, as signalled by occupancy detector D2–5. A corresponding operation is carried out by control unit C4–5 with respect to operation of switch machine S4–5 controlling switch 4–5.

Modular control unit C2–5 receives its second partial route command signal from transmission circuit 54 when the first cut clears switch 1–5 as described above. If the first cut has not passed through track switch 2–5, this command is simply recorded in control unit C2–5 for the time being and is put into effect only after the first cut clears switch 2–5. When the latter condition occurs, control unit C2–5 actuates switch machine S2–5 to throw the switch to its "normal" position and thus route the second cut onto track section 23A. This position for switch 2–5 is maintained until the second cut has entered the switch and has passed through it, as signalled by occupancy detector D2–5. Similar operations are carried out by each of the modular control units in the system.

In the course of operations, some error may occur or some mishap may take place in the classification yard requiring immediate clearing of all recorded route commands. Thus, a derailment at retarder 22 might require routing of any cuts already moving down the hump onto track 1 to avoid further damage. Under these circumstances, and under other conditions requiring clearing of the system, the operator actuates clearing signal SCL (FIG. 1).

Upon actuation of the clear signal, stepping switch control unit 52 is energized to advance stepping switch 47 until it is again synchronized with stepping switch 43, clearing any intervening storage units containing route command information. At the same time, a clearing signal is supplied through transmission circuit 54 to each of the modular control units to clear all recorded information in the control units as described more fully hereinafter. With an emergency situation as considered immediately above, the operator can then assume manual control of the system and particularly of switch 1–5 by actuating the AMS switch for switch 1–5 to manual position and by using the throw switch THS to establish track switch 1–5 in the "normal" condition to route all additional traffic onto track 1. Manual control can also be assumed with respect to each of the remaining switches in the system if this is necessary.

In a given instance, the operator may accidentally actuate the wrong track selector for a given cut, an error which becomes immediately apparent in the lowermost of the indicators 30A–30D showing a positive route command. To correct such an error, the operator actuates cancel switch SCN. Cancellation circuits associated with switch SCN cancel the recorded route command.

Operation of the individual switch machines, as controlled by the modular control units, can best be understood by reference to FIG. 3, the functional block diagram of unit C2–5. In the case of the first received route command, with the system clear of all traffic and with no previous route command information entered therein, as described above, a signal is supplied to input logic circuit 61 along line 63 from the main control unit 40. This signal is applied to storage unit 64 but is not recorded therein because occupancy logic circuit 67 indicates that there is no traffic in the controlled section of track encompassing switches 1–5 and 2–5. This information is derived by logic circuit 67 from its connection to the occupancy detector circuits D2–5 and D1–5. The circuit arrangement is such that the received command signal pertaining to switch machine S2–5 is passed through circuits 64 and 65 to circuit 66 directly without storage.

If switch machine S2–5 is already in the "reverse" position, there is no need to throw the switch and the command signal dies in transmission circuit 66. On the other hand, if switch machine S2–5 is in its "normal" position when the partial route command is received on circuit 63 under these circumstances, a throw signal is transmitted from circuit 66 to the switch machine and actuates the track switch to its "reverse" position.

From the foregoing description of the operation of main control unit 40, it will be apparent that no new partial command signals are received on circuits 62 and 63 until the first cut of cars has passed through track switch 1–5. When this occurs, and the second partial route command is received on input circuit 62, 63, the first cut may still be in the controlled section of track encompassing switches 1–5 and 2–5 and including track section 21. This condition, as signalled by detectors D1–5 and D2–5, causes occupancy logic circuit 67 to actuate the route command store 64 to record the received route command information. The second route command signal is retained in store 64 until such time as the first cut passes completely through switch 2–5 and detector D2–5 signals occupancy logic circuit 67 that the first cut has left the controlled switch. When this happens, the occupancy logic circuit actuates the route command readout store 65 which again actuates throw signal transmission circuit 66 to apply a throw signal to switch machine S2–5 if the new route command requires a change in position of switch 2–5. The local storage means 64 for the route command signals must have sufficient capacity to take care of the largest number of cuts that may be expected to be in the controlled section of track encompassing both of switches 1–5 and 2–5 at any given time, a capacity that will depend primarily upon the length of the intermediate track section 21 between the two switches. In most instances, a relatively limited capacity for the storage unit is sufficient and a five-command store, as described more explicitly hereinafter, is quite adequate for almost all installations.

If the system is to be cleared of all recorded route command information, a signal is supplied to the clear input logic circuit 68 along line 74 from main control unit 40. This clearing signal is applied to the route command store 64 to clear all information therefrom. It is also supplied to the cancel signal store 69 to eliminate any previously recorded cancel signals as discussed more fully hereinafter.

In some instances, operating conditions may occur which make it necessary or desirable to cancel a given route command at an intermediate point in the system, which of course also entails cancellation of the same route command from all subsequent control units in the system. There are also other circumstances with which it is necessary to defer cancellation of reported route command data in the modular control units pending completion of a switching operation already in progress.

For example, if it is assumed that the system is programmed for three cuts to go to classification tracks 2, 3 and 4 respectively, in that order, it may happen that the cut destined for track 3 reaches the initial point 25A in the track detector circuit for switch 2–5 (see FIG. 1) before the cut destined for track 2 leaves the switch. Under these circumstances, it is desirable to cancel the routing for the second cut because it is too close to the first cut to be distinguished by the system, which will assume that it is part of the first cut and will cause all subsequent routings to be in error. Under these circumstances, the local cancel switch CAN in control unit C2–5 is actuated by the system operator. A cancel signal is supplied to readout circuit 72 and applied directly to the route command store 64 to cancel the next route command, which would be the command pertaining to the second cut. At the same time, an actuating signal is supplied to cancel transmission circuit 73 to be transmitted to the next concerned control unit, in this instance the conrtol unit C2–3 to cancel the previously recorded route command at that control unit pertaining to the second cut.

Of course, control unit C2–5 may receive a remote cancel signal, such as those that it passes on to downstream control units over lines 75 and 76. Such a signal, as received on circuit 79, is applied to the cancel input logic circuit 71. When received, the error cancel input signal may be premature with respect to operation of control unit C2–5, depending upon the number of cuts present in the controlled track section encompassing switches 1–5 and 2–5 and determined by occupancy logic circuit 67. If immediate cancellation is possible, then the cancellation signal is supplied through circuits 69 and 72 to the route command store 64 and is transmitted through circuit 73 immediately to the next concerned control unit C2–3 or C4–5. If the cancel signal must be stored for any interval, it is recorded in store 69 and subsequently read out, in response to appropriate signals from the occupancy logic circuit 67 indicating that traffic conditions have reached a stage at which the cancellation operation should occur.

Retarder control unit RC, as noted above, receives retarder level control information on circuits 87 and 88 at the same time that route command information is supplied to the modular control units for the switch machines. In the case of the first cut entering the system after the system has been cleared of traffic and of previously recorded information, a received retarder level input signal is transmitted directly through retarder level input logic circuit 81 and circuits 84, 85 and 86 to actuate retarder 22 to the desired level. Any subsequent retarder level information received before the first cut clears switch 2–5, however, is recorded in the retarder level storage means 84. Stored or direct transmission of the retarder level signals to retarder 22 could be controlled from occupancy logic circuit 67. However, since the timing is the same as for transmission of throw signals to switch machine S2–5, there being no separate occupancy detection circuit for the retarder, the control connection is taken through line 77 from the throw signal transmission circuit 66 in control unit C2–5 to the retarder level storage apparatus 84, 85. That is, with the arrangement shown in FIG. 3, the recording and readout of retarder level information in control unit RC is actuated in accordance with the generation of throw signals in control unit C2–5.

In much the same manner, cancellation of previously recorded retarder level information in control unit RC is regulated by cancellation information relating to operation of switch machine S2–5. Thus, the connection afforded by circuit 78 from cancel store readout circuit 72 in control unit C2–5 is utilized to eliminate previously recorded retarder level data when a particular route command is cancelled. Clearing of the retarder level store 84, necessitated by clearing of the entire system, is accomplished by an appropriate signal supplied along line 74 and through the clear input logic 87 to retarder level store 84.

Figure 4:
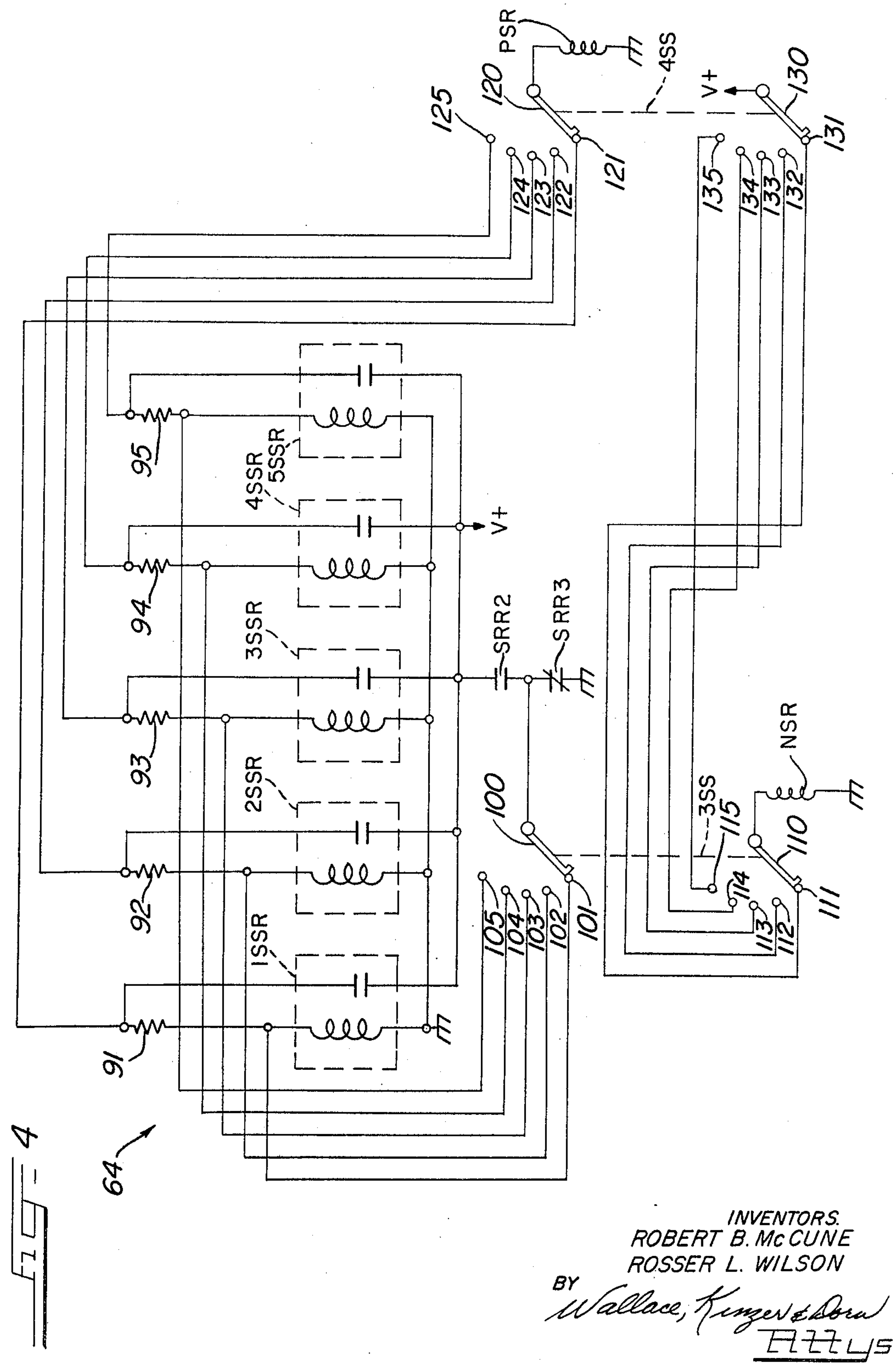
FIG. 4 is a detailed circuit diagram illustrating the route command storage apparatus for the modular control unit of FIG. 3.
Figure 5:
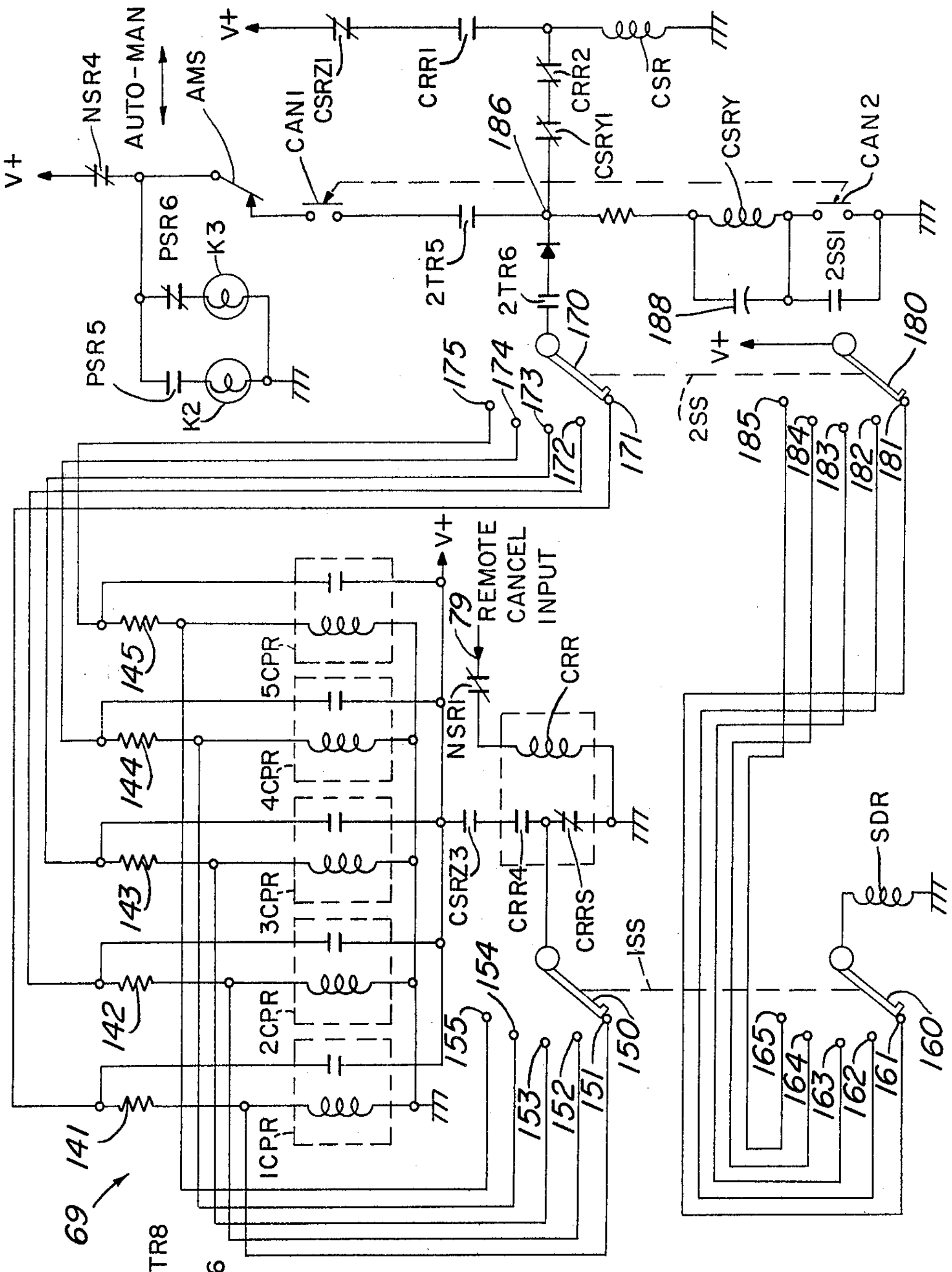
FIG. 5 is a detailed schematic diagram of the principal components for the cancel input logic and cancel store of the modular control unit of FIG. 3.
Figure 6:
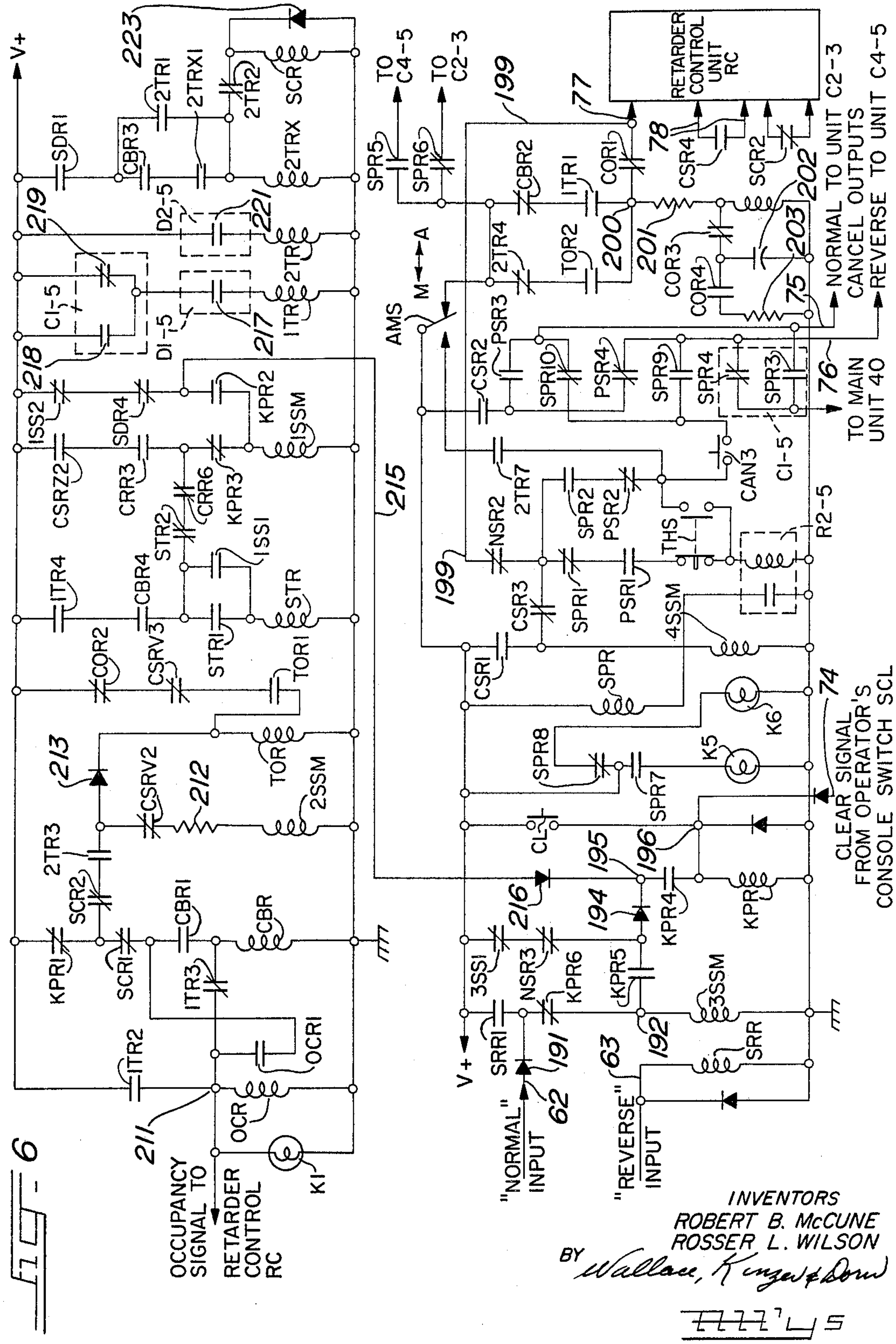
FIG. 6 is a circuit diagram for the remaining components of the modular control unit of FIG. 2.

OPERATING CIRCUIT FOR SPECIFIC EMBODIMENTS OF MODULAR CONTROL UNIT C2–5, FIGS. 4 THROUGH 6

FIGS. 4 through 6 illustrate, in detailed circuit diagrams, one form of construction that may be employed for a specific embodiment of the modular control unit that is used repetitively in the route switching system of the present invention. Control unit C2–5 has been selected for illustration, but the apparatus to be described could be used without change for each of the control units C2–3 and C4–5 and with only a minimal revision as described herein with respect to control unit C1–5.

FIG. 4 illustrates the principal operating components of the route command storage means 64, together with some of the components of the route command input logic circuit 61 and of other operating circuits in the control unit. The storage means comprises five individual switch storage relays 1SSR through 5SSR, sometimes referred to herein as route command storage relays. These are inexpensive relays each having only one set of normally open contacts. In each instance, one terminal of the operating coil for the relay is connected to system ground and the other terminal is connected to a respective one of five individual resistors 91 through 95. In each instance the contacts of the relay are connected in a holding circuit from the relay resistor to the positive voltage supply for the system, identified in the drawing as V+.

The storage means 64 illustrated in FIG. 4 further includes a two level stepping switch 3SS. The first level of switch 3SS comprises a wiper arm 100 that may be stepped to engage, in sequence, five individual contacts 101 through 105. It should be understood that from contact 105, arm 100 moves in a single step back to contact 101; this kind of construction is utilized with respect to each of the stepping switches incorporated in the modular control unit and described hereinafter. The stepping switches may be of the kind conventionally used for telephone applications and more specifically the kind in which stepping action is effected by an electromagnet or solenoid which steps the switch only upon completion of a cycle of operation in which the electromagnet is first energized and then de-energized. That is, stepping of the switch occurs upon de-energization of the electromagnet.

The first contact 101 of the initial level of stepping switch 3SS is electrically connected to the common terminal of resistor 91 and the operating coil of relay 1SSR. Corresponding connections are made from terminals 102–105 to storage relays 2SSR–5SSR.

The second level of switch 3SS comprises a wiper arm 110 engageable with five individual contacts 111 through 115. Wiper arm 110 is mechanically connected to switch arm 100 for conjoint stepping movement. The first wiper arm 100 of this stepping switch is connected to a pair of normally open contacts SRR2 of a storage recording relay described more fully hereinafter, the other contact of pair SRR2 being connected to the V+ supply. Wiper arm 100 is also returned to system ground through a pair of normally closed contacts SRR3 of the storage recording relay. Wiper arm 110, on the other hand, is connected to one terminal of the operating coil NSR of a "no storage" relay, the other terminal of coil NSR being returned to ground.

The apparatus illustrated in FIG. 4 further includes a second two-level stepping switch 4SS having two wiper arms 120 and 130 that are mechanically connected to each other for conjoint movement. Arm 120 is connected to one terminal of a future position storage relay coil PSR, the other terminal of coil PSR being returned to ground. Wiper arm 130 is connected to the V+ supply.

The contacts engaged by wiper arm 120 are again five in number and are identified as contacts 121 through 125. Switch terminal 120 is connected to the resistor 91 in the first stage of the route command store. Similarly, contacts 122 through 125 are connected to resistors 92 through 95, respectively. The individual switch terminals 131 through 135 in the second level of switch 4SS are individually respectively connected to the corresponding contacts 111 through 115 of the second level of stepping switch 3SS.

FIG. 5 illustrates the principal operating components constituting the cancellation and occupancy storage means 69 of modular control unit C2–5 (see FIG. 3), together with many of the operating components of the cancel input logic and cancel readout circuits of that modular control unit. The basic storage arrangement is quite similar to that described above in FIG. 4 with respect to the recording of route command information. Thus, the cancel storage means 69 comprises five individual cancel position storage relays 1CPR through 5CPR. Again, these may be simple and inexpensive relays each including only an operating coil and a single pair of normally open contacts. As before, one terminal of each of coils 1CPR through 5CPR is individually connected to one of five resistors 141–145, respectively. As in the route command store, the free terminal of each resistor is returned through the normally open contacts of the same relay to the V+ supply to afford a holding circuit for the relay.

The cancel storage means of FIG. 5 includes a two-level stepping switch 1SS having a first wiper arm 150 mechanically connected to a second wiper arm 160 for conjoint movement. Wiper arm 150 engages, in succession, five individual contacts 151 through 155. Contact 151 is connected to the common terminal of coil 1CPR and resistor 141. Similar connections are provided from switch contacts 152 through 155 to the storage relays 2CPR through 5CPR respectively.

Wiper arm 150 is electrically connected to a pair of normally open contacts CRR4 and to a pair of normally closed contacts CRR5 in a cancellation relay comprising an operating coil CRR. Contacts CRR5 are returned to system ground. The circuit connection of contacts CRR4 extends to the V+ supply through a pair of normally open contacts CSRZ3 of a cancellation store relay described more fully hereinafter. The operating coil CRR is connected to the remote cancel input line 79 (see also FIG. 3) in a circuit that includes, in series, a pair of normally closed contacts NSR1 of the "no storage" relay NSR (FIG. 4). The other terminal of coil CRR (FIG. 5) is returned to system ground.

Like the route command store 64 of FIG. 4, the cancel and occupancy store 69 of FIG. 5 includes a second dual-level stepping switch 2SS that includes two wiper arms 170 and 180 mechanically connected to each other. Wiper arm 170 is engageable with five individual contacts 171 through 175 that are individually connected to the storage relay resistors 141 through 145, respectively. The second wiper arm 180 in switch 2SS is electrically connected to the V+ supply and is engageable with five individual contacts 181 through 185. Each of the switch contacts 181 through 185 is directly electrically connected to the corresponding one of contacts 161 through 165 in the second section of stepping switch 1SS comprising wiper arm 160. Wiper arm 160 is electrically connected to one terminal of the operating coil SDR of a storage detection relay. The other terminal of coil SDR is returned to ground.

The movable contact 170 in the initial stage of stepping switch 2SS, FIG. 5, is electrically connected through a pair of normally open relay contacts 2TR6 to a terminal 186. Contacts 2TR6 are a part of a track relay 2TR that is incorporated in the occupancy logic circuit 67 (FIG. 3). Terminal 186 is connected to a series circuit comprising, in sequence, a resistor 187, the operating coil CSRY of an auxiliary cancel storage relay, and one section CAN2 of the local cancellation switch for control unit C2–5 (see FIG. 3), this circuit terminating at ground. A capacitor 188 is connected in parallel with relay coil CSRY. A pair of normally open relay contacts 2SS1, actuated by the electromagnet that operates stepping switch 2SS as described hereinafter, are connected in parallel with switch section CAN2.

Terminal 186 is also connected to the V+ supply in a circuit that includes, in series, a pair of normally open relay contacts 2TR5, a second normally open section CAN1 of the cancellation switch, the "automatic" side of the automatic-manual switch AMS, and a pair of normally closed contacts NSR4 of the "no storage" relay NSR.

Terminal 186 is also connected to one terminal of a cancel store relay coil CSR through a circuit that includes, in series, a pair of normally closed contacts CSRY1 of the auxiliary cancellation storage relay CSRY and a pair of normally closed contacts CRR2 of the cancellation relay CRR. The other terminal of cancel store relay coil CSR is returned to system ground. In addition, coil CSR is provided with an alternate circuit that extends through a pair of normally open contacts CRR1 of the cancellation relay and a pair of normally open contacts CRR1 of the cancellation relay and a pair of normally closed contacts CSRZ1 of a second auxiliary cancellation storage relay CSRZ (see FIG. 5A) to the V+ supply.

Figure 5A:
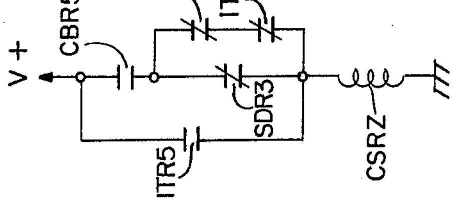
FIG. 5A is a detail circuit diagram of a part of the cancel input logic.

FIG. 5A shows the energizing circuits for the auxiliary cancellation storage relay comprising operating coil CSRZ. As shown therein, one terminal of coil CSRZ is connected to system ground and the other terminal is connected through three different circuits to the V+ supply. The first of these three energizing circuits is a direct circuit between V+ and coil CSRZ afforded upon closing of the normally open track relay contacts 1TR5. A second circuit extends through a pair of normally closed contacts SDR3 of the storage detection relay SDR and through a pair of normally open contacts CBR5 of a relay, incorporated in the occupancy logic circuit, that establishes the presence of a cut on the track section 21 between switches 1–5 and 2–5 (FIG. 1). The third circuit again includes normally open contacts CBR5 but also includes two sets of normally closed contacts 2TR8 and 1TR6 in the track relays that are actuated directly by the detection circuits for the switches 2–5 and 1–5, respectively.

FIG. 6 illustrates the remaining circuits for modular control unit C2–5. Starting with the route command input signal circuits 62 and 63 in the lower left-hand corner of FIG. 6, it is seen that the reverse input line 63 is connected to one terminal of the storage recording relay coil SRR, the other terminal of coil SRR being returned to system ground. The "normal" input line 62 is connected through a diode 191 and a pair of normally closed contacts KPR6 (part of a "clear panel" relay described more fully hereinafter) to one terminal of the operating magnet or solenoid 3SSM for the route command storage stepping switch 3SS (FIG. 4). The other terminal of coil 3SSM is returned to system ground. The coil is also connected through contacts KPR6 to an alternate energizing circuit comprising a pair of normally open contacts SRR1 that are a part of the storage recording relay.

Terminal 192 of magnet 3SSM is also connected through a pair of normally open contacts KPR5 of the clear panel relay to a terminal 193. Terminal 193 is connected to the V+ supply through a pair of normally closed contacts NSR3 of the "no storage" relay and, in series therewith, a pair of normally closed contacts 3SS1 actuated by the stepping switch magnet 3SSM. Terminal 93 is also connected through a diode 194 to a terminal 195 that is turn leads through a pair of normally open contacts KPR4 to one terminal 196 of the clear panel relay coil KPR, the other terminal of coil KPR being grounded. Terminal 196 of clear panel relay coil KPR is directly connected to a system clearing switch CL that may be associated with the operating components of the system, separate from console 20, the other side of switch CL being connected to the V+ supply. In addition, terminal 196 is connected to line 74 that extends back to the system clear switch SCL at the operator's console (FIGS. 1 and 2).

In FIG. 6, at the center lower portion of the drawing, a relay R2–5 is shown encompassed in a dash outline. Relay R2–5 is provided to represent the switch machine S2–5, the contacts of the relay constituting a switch at the switch machine that is either open or closed, depending upon the position of the track switch 2–5. One of the normally open contacts of relay R2–5 is shown as being connected to system ground, the other terminal being connected to a switch position relay SPR that is returned to the V+ supply of the system. The SPR relay is thus energized and de-energized according to the actual position of track switch 2–5. The arrangement illustrated in FIG. 6 is such that contacts of relay R2–5 are closed and coil SPR is energized whenever the switch machine S2–5 is in its "reverse" position. Conversely, relay coil SPR is de-energized for the "normal" position of the switch machine.

The two signal lamps K5 and K6 that indicate the present operating condition of switch 2–5 (see FIG. 1) are shown in FIG. 6 immediately to the right of the clear panel relay coil KPR. Lamp K6, which when energized indicates that the switch machine is in its "normal" position, is connected through relay contacts SPR8 from ground to the V+ supply of the system. Indicator lamp K5, on the other hand, is connected through a pair of normally open contacts SPR7 from ground to the V+ supply and is energized whenever switch machine S2–5 is in its "reverse" position.

Immediately to the right of the indicator lamps K5 and K6, in FIG. 6, is the operating magnet 4SSM for the stepping switch 4SS of the route command store 64 (see FIG. 4). One terminal of magnet 4SSM is connected to ground. The other terminal is connected through a pair of normally open contacts CSR1 of the cancellation storage relay to the V+ supply of the system. An alternate energizing circuit for coil 4SSM is provided through a pair of normally closed contacts CSR3 to a terminal 198 that is connected to a throw signal circuit 199 by a pair of normally closed relay contacts NSR2 of the "no storage" relay.

The throw circuit 199 from terminal 198 to the switch machine, represented in FIG. 6 by relay R2–5, branches into two parallel paths. The first of these two paths incorporates a pair of normally closed contacts SPR1 of the storage position relay and a pair of normally open contacts PSR1 of the future position storage relay. The alternate circuit comprises normally open contacts SPR2 and normally closed contacts PSR2. A normally closed section of the throw signal switch THS is incorporated in this circuit, which provides a direct connection to the switch machine S2–5, in this instance to the operating coil of the representative relay R2–5.

Following throw signal circuit 199 to the right-hand edge of FIG. 6, it is seen that the throw signal circuit connects through a pair of normally closed relay contacts COR1 to a terminal 200. Terminal 200 is returned to the V+ supply through two alternate circuits. The first of these circuits comprises a pair of normally open track relay contacts 1TR1 and a pair of normally closed relay contacts CBR2, in series with each other and in series with the "automatic" side of the manual-automatic switch AMS. The alternate circuit extends through a pair of normally open relay contacts TOR2 and a pair of normally closed contacts 2TR4 and the AMS switch to the V+ supply. This circuit arrangement may all be considered a part of the throw signal transmission circuit 66 (FIG. 3). Terminal 200 is also connected through a resistor 201 to one terminal of the operating coil COR of a relay utilized to signal the completion of a given route command operation in control unit C2–5. The other terminal of coil COR is returned to ground. One set of normally closed contacts COR3 of this relay is connected to a storage capacitor 202 to connect the capacitor in parallel with coil COR. Contacts COR3 also connect to a pair of normally open contacts COR4 of the same relay that are returned to ground through a bleed resistor 203.

The "manual" side of the manual-automatic switch AMS connects the V+ supply, through a pair of normally closed contacts 2TR7, to a normally open section of the throw switch THS and also to one section of the local cancellation switch CAN3. The other side of this section of throw switch THS is connected to the switch machine as represented in this instance by relay R2–5. The CAN3 switch is connected to a circuit network that supplies cancellation signals to the conductors 75 and 76 leading to downstream modular control units C2–3 and C4–5 respectively.

Thus, switch CAN3 is connected through a pair of normally open relay contacts SPR9 to the cancellation signal output line 76 leading to modular control unit C4–5.

The switch is connected through normally closed contacts SPR10 to line 75 extending to control unit C2–3.

Another circuit for applying a cancellation signal to the line 75 leading to control unit C2–3 begins with the V+ supply and extends through a pair of normally open contacts CSR2 of the cancel storage relay and a further pair of normally open contacts PSR3 of the future position storage relay to line 75. A similar circuit for supplying a cancellation signal to control unit C4–5 extends from the V+ supply through contacts CSR2 and through a pair of normally closed contacts PSR4 to line 76.

As discussed above, in conjunction with main control unit 40, it is necessary to supply certain information back to the main control unit from the first modular control unit C1–5. Cancellation information is transmitted back to the main control unit through normally closed contacts SPR4 from line 76 and through normally open contacts SPR3 from line 75. This part of the circuit shown in FIG. 6 would not be utilized in the downstream modular control units C2–5, C2–3 and C4–5.

Control of succeeding modular control units, following unit C2–5, is dependent upon the condition of the switch machine S2–5. To direct the transfer of significant information and to maintain an effective chain of control, power supply connections are made to the control units C2–3 and C4–5 from the "automatic" side of switch AMS through contacts of the switch position relay SPR. These connections are shown in FIG. 6 at the center right-hand edge of the figure. The connection to control unit C2–3 extends through the normally closed contacts SPR6. The connection to control unit C4–5 is through the normally open contacts SPR5.

Much of the occupancy logic circuitry 67 of control unit C2–5 (FIG. 3) is illustrated in the upper left-hand corner of the specific embodiment of FIG. 6. The occupancy logic circuit includes an occupancy relay having an operating coil OCR; one terminal of coil OCR is connected to system ground and the other terminal is connected to the V+ supply through a circuit that includes, in series, a pair of normally open contacts 1TR2 of the track relay 1TR. The occupancy relay includes a pair of normally open contacts OCR1 that afford a holding circuit for the relay, these contacts being connected in a circuit that extends from the relay coil terminal 211 through two pair of normally closed contacts SCR1 and KPR1 to the V+ supply. Terminal 211 is also connected to the retarder control unit RC and to the signal lamp K1 that indicates occupancy of the track switch 2–5 (see FIG. 1).

Terminal 211 in FIG. 6 is also connected through a pair of normally closed contacts 1TR3 to one terminal of the operating coil CBR of the "cut-between" relay that determines the presence of a cut of cars between switches 1–5 and 2–5 in the classification yard. This terminal of coil CBR is also provided with a holding circuit comprising a pair of normally open contacts CBR1 of the same relay and the normally closed contacts SCR1 and KPR1. The other terminal of coil CBR is returned to system ground.

The electromagnet or solenoid 2SSM for the stepping switch 2SS that is a part of the occupancy and cancellation store of the modular control unit has one terminal connected to the system ground and the other terminal connected to an energizing circuit that includes a series resistor 212. The energizing circuit further includes a pair of normally closed contact CSRY2, a pair of normally open relay contacts 2TR3 of the second track relay, a pair of normally closed contacts SDR2 of the storage detection relay (see FIG. 5) and the normally closed contacts KPR1 of the clear panel relay. The circuit comprising contacts KPR1, SDR2 and 2TR3 also constitutes an energizing circuit for a throw order relay coil TOR, a diode 213 being interposed in this circuit. A holding circuit for coil TOR is provided through normally open contacts TOR1 of the relay and through two pair of normally closed contacts CSRY3 and COR2. The other terminal of coil TOR is returned to system ground.

Immediately to the right of throw order relay coil TOR, in FIG. 6, is the operating coil STR of a storage transfer relay. One terminal of coil STR is connected to system ground. The energizing circuit for the coil extends through a pair of normally open contacts 1SS1 that are actuated by the electromagnet 1SSM that controls the stepping switch 1SS (FIG. 5) in the cancel and occupancy store. As shown in FIG. 6, this energizing circuit, from contacts 1SS1, extends through a pair of normally open contacts CBR4 of the "cut between" relay and through a pair of normally open contacts 1TR4 of the first track relay to the V+ supply. A holding circuit is provided by a pair of normally open contacts STR1 of the storage transfer relay, contacts STR1 being connected in parallel with the energizing contacts 1SS1.

The electromagnet 1SSM for the stepping switch 1SS is shown immediately to the right of coil STR in FIG. 6. One terminal of solenoid 1SSM is connected to system ground and the other terminal is connected to the V+ supply through two energizing circuits. The first of these energizing circuits comprises, in series, a pair of normally closed contacts KPR3 of the clear panel relay and two pair of normally open contacts CRR3 and CSRZ2. This energizing circuit also includes a branch circuit that connects the common terminal of contacts KPR3 and CRR3 through the series combination of two sets of normally closed contacts CRR6 and STR2 to the energizing circuit for storage transfer relay coil STR. The alternate energizing circuit for electromagnet 1SSM extends through a pair of normally open contacts KPR2 and two pair of normally closed contacts SDR4 and 1SS2 to the V+ supply. The terminal 214 intermediate contacts SDR4 and KPR2 is connected by a conductor 215 through a diode 216 back to the terminal 195 in the operating circuit for the clear panel relay coil KPR.

The two track relay coils 1TR and 2TR, pertaining to the track switches 1–5 and 2–5, respectively, are shown in FIG. 6 immediately to the right of stepping switch magnet 1SSM. One terminal of coil 1TR is connected to system ground. The other terminal is connected through a pair of normally open contacts 217 in the occupancy detector D1–5 to the preceding modular control unit C1–5. In modular control unit C1–5, connection is made to the V+ supply through a pair of normally open contacts 218. Contacts 218 are a part of the switch position relay in the initial modular control unit C1–5 and thus correspond to contacts SPR5 of modular control unit 2–5. If modular control unit 2–5 were located in the "normal" leg of the track switch instead of in the "reverse" leg, the related pair of contacts 219 in modular control unit C1–5 would be employed.

The connections for track relay coil 2TR are somewhat simpler. One terminal of the coil is connected to system ground and the other terminal is connected through a pair of normally open contacts 221 in the occupancy detector D2–5 to the V+ supply. It should be understood that contacts 221 are closed whenever one or more railway vehicles are present in track switch 2–5. Similarly, contacts 217 are closed whenever there is a railway vehicle present in track switch 1–5.

The circuit of FIG. 6 further includes an auxiliary track relay 2TRX. One terminal of relay coil 2TRX is connected to system ground and the other terminal is connected to an energizing circuit that includes, in series, a pair of normally open contacts 2TR1 of the track relay 2TR and a pair of normally open contacts SDR1 of the storage direction relay. A holding circuit is provided for relay 2TRX, this circuit including, in series, a pair of normally open contacts 2TRX1 of the relay and a pair of normally open contacts CBR3 from the "cut between" relay, contacts 2TRX1 and CBR3 being connected in a circuit that is parallel with the energizing circuit through contacts 2TR1.

Immediately to the right of coil 2TRX is the operating coil SCR of a system clearing relay. The other terminal of coil SCR is connected through a pair of normally closed contacts 2TR2 to the energizing circuit for the auxiliary track relay 2TRX. A diode 233 is connected in parallel with coil SCR.

With relay circuits of the kind illustrated in FIG. 6, it is quite difficult to assign the complete relay structure, including operating coil and contacts, to a particular section in the functional block diagram of control unit 2–5 (FIG. 3). However, the system clearing relay SCR, the track relays 1TR and 2TR, the throw order relay TOR, and the storage transfer relay STR may all be considered as constituting parts of the occupancy logic circuit 67. The throw signal transmission circuit 66 and the cancel transmission circuit 73 comprise, basically, the switch position relay SPR and the future position-of-switch relay PSR with, of course, the interconnections to the occupancy logic circuit 67. The route command readout store 65 comprises, essentially, stepping switch SS4 and the "no storage" relay NSR. The cancel store readout circuit 72 includes stepping switch SS2, the cancel store relay CSR and its auxiliary CSRY, and the storage detection relay SDR. The cancel and occupancy store 69 includes the storage relays 1CPR through 5CPR and the stepping switch SS1. Correspondingly, the route commond store 64 comprises the storage relays 1SSR through 5SSR and the stepping switch SS3. The clear system circuit 68 is provided primarily by the clear panel relay KPR. The cancel input logic circuit 71 comprises, in particular, the cancel relay CRR and the auxiliary cancel storage relay CSRZ. The basic function of route command input logic circuit 61 is provided by operation of the relay SRR.

OPERATION OF SPECIFIC EMBODIMENT OF MODULAR CONTROL UNIT C2–5, FIGS. 4–6

(A) Recording data for future switching operations

The basic route command storage apparatus for control unit C2–5 is that illustrated in FIG. 4. Before considering operation of the modular control unit with respect to various traffic conditions, it is first necessary to set forth the basic procedure followed in recording individual partial route commands in this storage apparatus.

For a given partial route command, a positive voltage signal appears on line 62 in the lower left-hand corner of FIG. 6, if the vehicle or cut to which that command applies is to be routed through switch 2–5 with the switch in the "normal" position to direct traffic onto track section 22 (FIG. 1). On the other hand, if the cut or vehicle is to be routed through switch 2–5 with the switch in the "reverse" position, directing the vehicle or cut to track section 23, a "reverse" signal input is supplied to the modular control unit line 63.

Considering first the occurrence of the route command that requires "normal" positioning of switch 2–5, the input signal on line 62 energizes stepping switch magnet 3SSM (FIG. 6) directly through the normally closed contacts KPR6. There is no actuation of the storage recording relay SRR. Subsequently, when the input signal on line 62 is terminated, and magnet 3SSM is de-energized, switch 3SS steps forward one step. Starting from the illustrated position in FIG. 4, wiper arms 100 and 110 move clockwise one contact position to engage contacts 102 and 112 respectively. Because the storage recording relay SRR has not been energized, contacts SRR2 remain open and contacts SRR3 remain closed. Accordingly, when the stepping action is complete, there has been no energization of the route command storage relay 1SSR to which wiper arm 100 of stepping switch 3SS has been connected. The relay 1SSR is left in its de-energized operating condition, a condition which signifies a "normal" switch position is required in relation to the recorded route command.

A command signal received on the "reverse" input line 63, on the other hand, energizes storage recording relay coil SRR (FIG. 6). When this occurs contacts SRR2 close and contacts SRR3 open (FIG. 4). This operation of the storage recording relay contacts completes an operating circuit from the V+ supply through contacts SRR2 and wiper arm 100 of stepping switch 3SS to contact 101 and thence to the coil of storage relay 1SSR, assuming that switch 3SS starts from the position illustrated in FIG. 4. The closing of contacts SRR1 (FIG. 6) energizes the electromagnet 3SSM for stepping switch 3SS.

When the reverse input signal on line 63 terminates, the storage recording relay coil SRR is de-energized and the relay drops out. The consequent opening of contacts SRR1 de-energizes magnet 3SSM (FIG. 6) and stepping switch 3SS (FIG. 4) is again advanced by one step. Of course, when contacts SRR1 drop out, contacts SRR2 also open and contacts SRR3 close, since all are controlled by the same relay coil SRR. However, the storage relay energized to indicate a "reverse" switch position, in this instance relay 1SSR, remains energized through the holding circuit established through its own relay contacts. In this manner, a "reverse" condition is recorded as a route command for a vehicle or cut of vehicles moving through the controlled track section. In each instance, the recording action is completed upon the stepping of switch 3SS, which conditions the storage apparatus for recording of further route commands.

(B) Direct transmission of throw signals to switch machine S2–5

Figure 7:
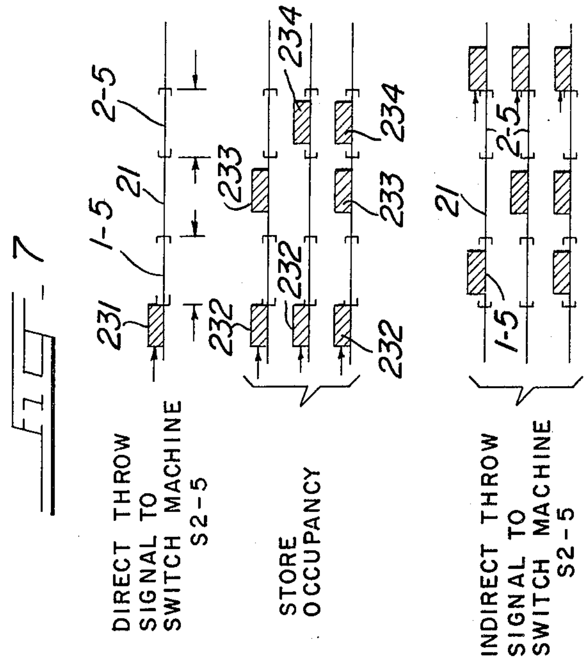
FIG. 7 is a chart illustrating traffic conditions controlling the transmission of throw signals to the switch machine controlled by the modular control unit of FIG. 3.

FIG. 7 illustrates a number of different traffic conditions that govern the transmission of throw signals to switch machine S2–5 from modular control unit C2–5. The first traffic situation illustrated in FIG. 7 is one in which a vehicle or cut 231 enters the controlled track section encompassing switches 1–5 and 2–5 with no preceding vehicle in the controlled track section. Under these circumstances, there is direct transmission of a throw signal to switch machine S2–5.

When the cut 231 enters switch 1–5 (FIG. 7) the occupancy detector D1–5 for the first track switch is actuated, closing contacts 217 (FIG. 6). Assuming that the cut is to be routed through switch 2–5, contacts 218 in modular control unit C1–5 have already been closed, since it was necessary to throw switch 1–5 to its "reverse" position before the cut entered that switch. Accordingly, it is seen that an energizing circuit is established, upon closing of detector contacts 217, actuating the first track relay 1TR.

With no other traffic in the controlled track section illustrated in FIG. 7, contacts CBR2 in the throw signal circuit of the lower right-hand corner of FIG. 6 are in their normally closed condition. Since operation is being carried forward in the automatic mode, a partial route command has previously been recorded in control unit C2–5 to control the route followed by vehicle 231, so that contacts NSR2 are closed. Assuming there has been no cancellation signal for the partial route command previously recorded, contacts CSR3 are also closed. Accordingly, actuation of the track relay 1TR and the consequent closing of contacts 1TR1 establishes a connection from the V+ supply through switch AMS, contacts CBR2, 1TR1, COR1, NSR2, and CSR3 to stepping switch magnet 4SSM. Stepping switch 4SS does not step immediately; the construction employed is one which provides for advancement of the stepping switch when the magnet 4SSM is de-energized. Furthermore, closing of contacts 1TR1 energizes the completed operation relay coil COR, but actuation of this relay is delayed by a predetermined time interval after completion of connection of the throw circuit 199 to the V+ supply, a time interval determined by the time required to charge capacitor 202 in the operating circuit for the relay coil COR.

If the switch position relay SPR (FIG. 6) is in its unenergized condition, indicating that the switch machine S2–5 is in its "normal" operating position, and if the position—as switch relay PSR is also in its unenergized condition, indicating storage of a route command requiring a "normal" position for the switch machine S2–5, the throw signal on line 199 cannot pass through the parallel circuits comprising contacts SPR1 and SPR2 and PSR1 and PSR2. That is, if the switch machine S2–5 is already in the desired position for the next cut, cut 231 (FIG. 7), then no throw signal is supplied to the switch machine S2–5 represented in FIG. 6 by relay R2–5 because that switch machine is already in the desired position and need not be thrown.

The same condition applies if the relay SPR is energized, indicating that the switch machine S2–5 is in its "reverse" position, and the relay PSR is also energized, indicating that a "reverse" position is desired for routing of cut 231. Under these circumstances, contacts SPR1 and PSR2 are open so that again no throw signal is transmitted to the switch machine S2–5.

If relay SPR (FIG. 6) is de-energized, indicating that switch machine S2–5 is in its "normal" position, but relay PSR (FIG. 4) is energized showing that a "reverse" position is required for the new cut 231 entering the controlled track section, a throw signal is transmitted from terminal 198 (FIG. 6) to the switch machine S2–5, as represented by relay R2–5. The throw signal is transmitted through contacts SPR1 and PSR1 and actuates the switch machine to its "reverse" position.

Similarly, if relay SPR is energized, showing that the switch machine is presently in its "reverse" position, and relay PSR is de-energized to indicate that a "normal" position is required for routing of cut 231, the throw signal is transmitted from terminal 198 to the switch machine represented by relay R2–5 through contacts SPR2 and PSR2.

The foregoing direct transmission operations occur only if there are no other cuts occupying the controlled section of the track encompassing switches 1–5 and 2–5. Other throw signal transmission situations are treated separately hereinafter.

When cut 231 advances into the controlled track section sufficiently to clear switch 1–5 (see FIG. 7), the track relay 1TR is de-energized as indicated by the timing chart, FIG. 9. When this happens, contacts 1TR1 open, interrupting the throw signal circuit 199 if that circuit has not already been opened by actuation of relay COR and the consequent opening of contact COR1. Either action is effective to de-energize stepping switch magnet 4SSM. Upon de-energization of magnet 4SSM, stepping switch 4SS (FIG. 4) advances one step to condition the control section for the next cut of cars to be routed therethrough.

When track relay 1TR is first energized by cut 231 entering the controlled track section, as described above, contacts 1TR2 (upper left-hand corner, FIG. 6) close to energize the occupancy relay coil OCR. As soon as coil OCR is energized, contacts OCR1 close, establishing a holding circuit for the occupancy relay. The occupancy relay coil OCR remains energized as long as the cut 231 remains in the controlled track section (FIG. 7) as indicated by the timing chart (FIG. 9).

When the occupancy relay for the controlled track section, coil OCR, is energized, the related "cut-between" relay coil CBR (FIG. 6) is not immediately energized because the track relay contacts 1TR3 are open at that time due to energization of the track relay. When cut 231 leaves switch 1–5 (FIG. 7) contacts 1TR3 again close. Consequently, the cut between relay coil CBR is energized through the closed contacts OCR1 that constitute the holding circuit for the occupancy relay OCR. The cut between relay coil CBR establishes its own holding circuit through its contacts CBR1 to hold the cut between relay energized as long as cut 231 remains at any point within the controlled track section.

The energization of the cut between relay coil CBR opens the normally closed contacts CBR2 in the throw signal circuit 199 in the lower right-hand corner of FIG. 6. Opening of contact CBR2 prevents transmission of a throw signal to the second switch machine S2–5, represented in FIG. 6 by relay R2–5, until after cut 231 leaves the control section. Thus, the cut between relay prevents premature transmission of a throw signal to the controlled switch machine S2–5 during the period in which the cut occupies the intermediate section 21 of the track or the second switch 2–5.

Referring again to FIG. 7, when the cut or vehicle 231 reaches the second track switch 2–5 its presence is detected by the detector circuit D2–5. Referring to FIG. 6, in the upper right-hand portion thereof, it is seen that the closing of contacts 221 in detector circuit D2–5 completes an energizing circuit for the second track relay 2TR of modular control unit C2–5. Assuming that there has been no cancellation operation, and further assuming that no other cut is presently located in the controlled section of track, operating conditions which are discussed subsequently, the storage detection relay SDR is presently energized and its contacts SDR1 are closed. Consequently, actuation of the second track relay 2TR and the consequent closing of its contacts 2TR1 causes the auxiliary track relay coil 2TRX to be energized.

Energization of auxiliary track relay coil 2TRX closes its contacts 2TRX1 and establishes a holding circuit for the auxiliary track relay. At this point in the operating cycle, it will be recalled, the cut between relay CBR is energized; consequently, contacts CBR3 are closed (see the timing chart, FIG. 9). Energization of relay coil 2TRX thus does not immediately result in energization of the system clearing relay coil SCR, since contacts 2TR2 open promptly and prevent premature energization of the clearing relay.

When cut 231 (FIG. 7) passes completely beyond switch 2–5 and hence leaves the controlled track section, occupancy detector D2–5 detects the passage of the cut and opens contacts 221. Consequently, track relay 2TR is de-energized. When this occurs, contacts 2TR2 of the second track relay return to their normal closed condition with the result that the system clearing relay coil SCR is energized through these contacts and through the holding circuit for auxiliary track relay coil 2TRX, comprising contacts 2TRX1, CBR3, and SDR1. Energization of the system clearing relay coil SCR opens the normally closed contacts SCR1 (FIG. 6 upper left hand corner) and interrupts the operating circuit for both the occupancy relay coil OCR and the cut between relay coil CBR. When relay CBR drops out, its contacts CBR3 open, dropping out the system clearing relay SCR. This restores the circuit to its original operating condition, ready for a subsequent cut of cars or individual cars.

Under the operating conditions discussed above, when track relay coil 2TR is energized, storage detection relay coil SDR (FIG. 5) is already energized, this being the normal condition for the storage detection relay as long as stepping switches 1SS and 2SS are in step. Consequently, although contacts 2TR3 in the operating circuit for the stepping switch magnet 2SSM (FIG. 6) are closed when the cut enters the second track switch, the magnet 2SSM is not energized because the relay contact SDR2 are open. It is thus seen that there is no stepping of either of switches 1SS or 2SS in the passage of a single cut through the controlled track section, with no cancellation or similar operation entailed.

(C) Storage and transmission of throw signals when cut enters controlled track section while prior cuts remain in section There are a number of potential situations in which a car or cut of cars may enter the controlled track section while one or more cuts remain present in the track section. Three possible situations are illustrated in the second, third, and fourth lines of FIG. 7. For example, a cut 232 may enter the first switch 1–5 in the section while one or more additional cuts 233 are located intermediate switches 1–5 and 2–5 on the track section 21. A second and related situation is presented if the trailing cut 232 enters the controlled track section while the intermediate track section 21 is empty but while a preceding cut 234 is located in the final switch 2–5 of the controlled track section. The third possible situation is one in which the trailing cut 232 enters the controlled track section while the final switch 2–5 is occupied by a preceding cut 234 and while the intermediate track section 21 is occupied by one or more additional cuts 233. Under any of these circumstances, the occupancy relay OCR and the cut between relay CBR are both energized at the time the trailing cut 232 enters the initial switch 1–5, the manner in which these occupancy logic relays are energized having been described above. Moreover, and also as described above, the storage detection relay SDR is already energized. Thus, initial operating conditions are as shown in FIG. 10. The entry of the trailing cut 232 is again indicated by energization of the initial track relay 1TR effected by closing of the contacts 217 of the track occupancy detector D1–5 (FIG. 6).

Upon energization of track relay 1TR, contacts 1TR4 (top center, FIG. 6) are closed. Because cut-between relay contacts CBR4 are already closed, coil CBR having previously been energized, stepping switch magnet 1SSM is energized through the circuit comprising contacts 1TR4, CBR4, CRR6, and KPR3. Energization of the stepping switch magnet 1SSM closes contacts 1SS1, located to the left and slightly above the magnet in FIG. 6. This establishes an energizing circuit for the storage transfer relay coil STR. The consequent closing of contacts STR1 establishes and maintains a holding circuit for the storage transfer relay.

When the storage transfer relay coil STR is energized, contacts STR2 open, thereby breaking the operating circuit to the stepping switch magnet 1SSM. As a consequence, stepping switch 1SS (FIG. 5) is advanced one step. Assuming that stepping switch 1SS has started from the position shown in FIG. 5, the advancement of wiper 160 from contact 161 to contact 162 breaks the operating circuit for storage detection relay SDR. Storage detection relay is maintained de-energized thereafter until such time as the related stepping switch 2SS catches up to switch 1SS as described hereinafter.

When the trailing cut 232 has passed through switch 1–5 and leaves that switch (FIG. 7), the initial occupancy detector D1–5 detects this movement and opens contact 217 (FIG. 6), dropping out track relay 1TR. This opens contact 1TR4 and de-energizes relay STR. Alternatively, the storage transfer relay STR may be de-energized, by action of the "cut between" relay. Thus, if any and all preceding cuts in the controlled track section leave the section, clearing switch 2–5, before the trailing cut 232 leaves the first switch, then contacts CBR4 will open before contacts 1TR4. This also results in breaking of the energizing circuit for the storage transfer relay STR.

As noted above, the cut-between relay coil CBR is energized when the trailing cut 232 enters the control section (FIG. 7). Consequently, the closing of contacts 1TR1 in the throw signal circuit 199 (FIG. 6, lower right hand corner) cannot supply a throw signal to the switch machine relay R2–5 because contacts CBR2 are open. Transmission of the throw signal to the switch machine is now placed under the control of the second track relay 2TR.

With the storage detection relay coil SDR (FIG. 5) de-energized due to the presence of two or more cuts in the controlled track section, as described above, contacts SDR2 (FIG. 6 upper left-hand corner) are closed. Consequently, when the leading cut in the controlled track section, such as cut 233 or cut 234 in FIG. 7, enters the second track switch 2–5, actuating the second track relay 2TR as described above, the closing of the contacts 2TR3 energizes both the stepping switch magnet 2SSM and the throw order relay coil TOR. The operating circuit extends through contacts KPR1, SDR2, and SDR3. Contacts TOR1 are closed to establish a holding circuit for the throw order relay; diode 213 prevents this from being a holding circuit for the stepping switch magnet 2SSM. Actuation of the throw order relay also closes contacts TOR2 in the throw circuit 199 (FIG. 6 lower right-hand corner) but cannot yet initiate a throw signal that will be effective because the series contacts 2TR4 are open.

When the leading cut leaves the second switch 2–5 of the controlled track section, track relay 2TR is de-energized by opening of the contacts 221 in the detector circuit D2–5 (FIG. 6). Contacts TOR2 have previously been closed, as described above. Consequently, the reclosing of contacts 2TR4 upon de-energization of track relay 2TR completes a circuit connection from the V+ supply to circuit 199 and thus applies a throw signal to the switch machine relay R2–5, as described above. Of course, actual transmission of a switching signal to the switch machine is dependent on whether or not the switch machine requires actuation to a different operating condition than already obtained. As before, the throw signal is terminated by operation of the complete operation relay COR, which opens contacts COR1 a set time interval after initiation of the throw signal. Moreover, energization of the completion-of-operation relay coil COR de-energizes the throw order relay coil TOR by momentarily opening contacts COR2. The action is momentary because as soon as relay TOR drops out, its contacts TOR2 open and relay COR is energized. The time relation for the relays 2TR, TOR, COR, the stepping switch magnet 2SSM, and the throw signal for the trailing cut are all shown in FIG. 10.

Movement of the leading cut out of the controlled track section, and consequent de-energization of track relay 2TR, is also effective to open contacts 2TR3 in the operating circuit for the stepping switch magnet 2SSM. When magnet 2SSM is de-energized, stepping switch SS2 (FIG. 5) advances one step.

The foregoing detailed description of operation assumes only two cuts present in the controlled section, the situation represented by cuts 232 and 233 in the second line of FIG. 7. The operation remains essentially unchanged for three or more cuts. The throw signal operation is controlled, under these circumstances, in accordance with occupancy of the second track switch 2–5, and specifically by operation of the track relay 2TR. A throw signal is initiated each time a cut leaves the second switch as signalled by de-energization of relay 2TR. The storage detection relay SDR remains de-energized as long as at least two cuts are in the controlled section of track beyond the first switch 1–5. The occupancy relays OCR and CBR remain energized as long as at least one cut occupies the controlled track section. Thus, operation proceeds as described above and throw signals are transmitted as indicated by the fifth, sixth, and seventh lines of FIG. 7, until all cuts are properly routed out of the controlled track section.

Ultimately, when the last cut 232 (FIG. 7) clears the controlled track section, with storage detection relay coil SDR energized, the system clear relay coil SCR is energized as described above and restores the system to its original condition awaiting a new cut of cars or a new series of cuts. As long as any routing signals are stored in the route command register comprising relays 1SSR through 5SSR (FIG. 4) the "no-storage" relay remains de-energized. Under these conditions, contacts NSR2 in the throw signal circuit 199 (FIG. 6) remain closed. When there are no further route commands stored in the modular control unit, relay NSR is energized and contacts NSR2 are opened. Under these circumstances there is no route command information available for automatic routing of the vehicles and track switch 2–5 must be controlled manually until new data are supplied to the control unit.

(D) Direct local cancellation of routing commands

There are two circumstances under which the operator of the automatic route switching system may be required to cancel correctly entered route commands. These two situations, illustrated in the first two lines of FIG. 8, occur when a trailing cut 235 catches up to and actually couples to a leading cut 236 as shown in line 1 of FIG. 8. A similar situation is presented when a trailing cut 237 approaches a leading cut 238 (line 2 FIG. 8) so closely that the distance between the two cuts is less than the minimum spacing required for operation of the track detector circuits. In each instance, the leading cut has already entered track switch 2–5.

To cancel a previously recorded route command under either of the foregoing circumstances, the system operator presses the cancel switch CAN associated with track switch 2–5 on the control panel 20 (FIG. 1) closing switches CAN1 and CAN2 (FIG. 5) and also closing switch CAN3, FIG. 6. In FIG. 5, the closing of switches CAN1 and CAN2 completes an energizing circuit to the cancel store relay coil CSR and to the auxiliary cancel store relay coil CSRY. This energizing circuit is completed through the contacts 2TR5, which are closed due to the presence of a cut or cuts in the second track switch 2–5 as described above. The cancel stores coils CSR and CSRY cannot remain energized after the operator releases the cancel switch because there is no alternate holding circuit. Moreover, energization of the CSR relay is only momentary because contacts CSRY1 open immediately and interrupt the energizing circuit for the main cancel store coil CSR.

The closing of switch CAN3 (FIG. 6) does not produce a direct cancellation output signal on either of lines 75 or 76, even if switch AMS is in its manual position, because track relay contacts 2TR7 are open due to the presence of a cut in the track switch 2–5.

The momentary energization of cancel store relay coil CSR as described above causes a momentary closing of contact CSR1 in the operating circuit for the stepping switch electromagnet 4SSM, in the lower center portion of FIG. 6. Contacts CSR1 open almost immediately, de-energizing electromagnet 4SSM, with the result that stepping switch 4SS (FIG. 4) advances one step. This advancement of stepping switch 4SS out of the regular sequence of operations causes the system to skip the next recorded stored switching command in the storage register comprising relays 1SSR through 5SSR. In this manner, local cancellation of just one stored route command is achieved.

The momentary actuation of the cancel storage relay CSR, as described above, also closes contacts CSR2 in the cancellation output circuit connected to conductors 75 and 76 (FIG. 6). If the future position relay PSR has not previously been energized, indicating that the trailing cut was to be routed through the second switch in the "normal" direction, the cancellation signal goes to conductor 76 and then to modular control unit C4–5 through contacts PSR4. If the PSR relay has been energized for "reverse" routing, the cancellation signal goes to the other cancellation output conductor 75 and to unit C2–3 through contacts CSR3. Cancellation may be extended to as many stored commands as there are in the SSR register (FIG. 4) providing the space between cuts is less than the minimum presence detector length. As noted above, in the control section C1–5 for the first track switch 1–5 only, the cancellation signal would be fed back to the main control unit 40 through contacts SPR3 or SPR4 if, and only if, the PSR and SPR relays are both energized or both de-energized.

In the event that the cancellation switch CAN is pressed by the operator with no cut present in the second track switch 2–5, a cancellation signal is transmitted to the appropriate downstream modular control unit through the electrical switch CAN3 and one of the contact pairs SPR9 and SPR10 of the switch position relay. Of course, this can be done only if switch AMS on the operator's console is in the "manual" position (see FIG. 6).

Figure 8:
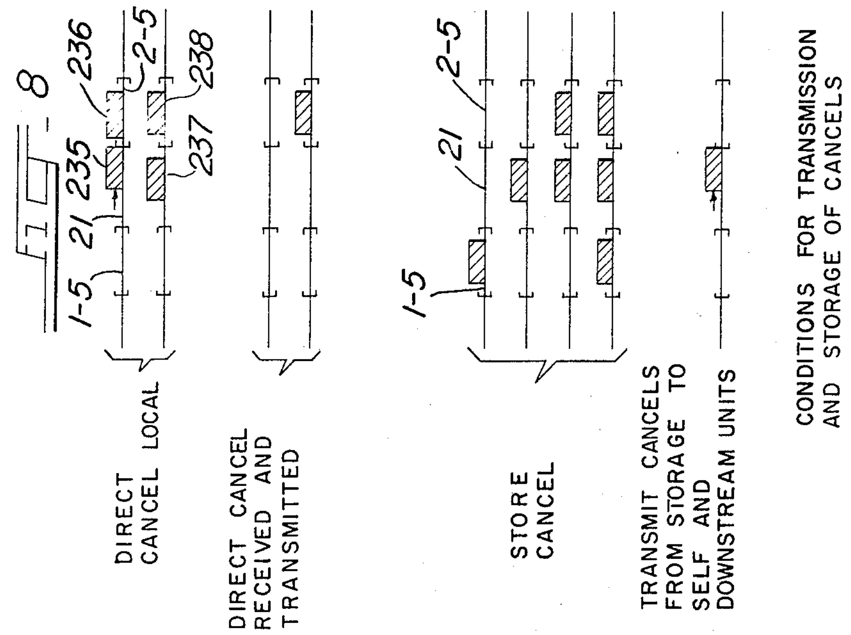
FIG. 8 is a chart illustrating traffic conditions governing the transmission and storage of cancel signals in the operation of the modular control unit of FIG. 3.

(E) Direct cancellation received from preceding modular control unit and transmitted to downstream unit There are two circumstances under which the modular control unit 2–5 receives a cancellation signal directly from the preceding control unit 1–5 and transmits that signal, without storage, to one of the downstream modular control units C2–3 or C4–5. The first situation in which this occurs, illustrated in line 3 of FIG. 8, is when there are no vehicles occupying the controlled track section starting with switch S1–5 and ending with switch S2–5. The other traffic condition under which this operation takes place is illustrated in line 4 of FIG. 8; it occurs when there is a single cut present in switch 2–5. In both instances, of course, cancellation occurs only with respect to data previously recorded in the route command register comprising relays 1SSR through 5SSR (FIG. 4).

When a local cancellation has occurred, upstream from the control unit C2–5, in control unit C1–5, or when a system cancellation is effected (discussed later) a remote cancel input signal is received on line 79 (FIG. 5) and energizes the cancellation relay coil CRR. The cancellation signal is effective only when route commands have previously been stored in the system and the no-storage relay coil NSR is in a de-energized condition with contacts NSR1 closed. The actuation of the cancellation relay closes contacts CRR1 and energizes the cancel store relay coil CSR (FIG. 5). But contacts CRR2 are opened, so that the closing of contacts CRR1 does not cause the auxiliary cancel store relay coil CSRY to be energized. Energization of the CSR relay transmits a cancellation signal to one of the downstream modulator control units by closing contact CSR2 in FIG. 6, as described above.

Energization of the cancellation storage relay coil CSR also closes contacts CSR1 to energize the magnet 4SSM for the stepping switch 4SS, as described above. When the remote cancellation input signal to coil CRR is terminated, and the CRR relay drops out, the CSR relay also drops out because there is no auxiliary holding circuit and coil CSR is dependent upon contacts CRR1 to remain energized. When the cancellation storage relay CSR is de-energized, contacts CSR1 (FIG. 6) open to de-energize magnet 4SSM and step switch 4SS. This action is not affected by the presence or absence of a single cut of cars in the second track switch 2–5. However, the cancellation operation is quite different if there are any cuts in the controlled track section ahead of track switch 2–5, as described in detail hereinafter.

(F) Storage of cancellation information

There are several distinct situations in which a cancellation signal received by the modular control unit C2–5 must be stored temporarily to avoid disrupting operation of the route switching system. The basic situations in which storage of cancellation information is required are illustrated in lines 5 through 8 of FIG. 8.

Thus, cancellation signals received by the modular control unit C2–5 while a cut or vehicle occupies the first track switch 1–5 must be stored until a subsequent time. This situation is illustrated by the first line in FIG. 8. Storage is also required in the traffic situation represented in the sixth line of FIG. 8, where there is a cut (or cuts) of cars present on the track section 21 intermediate switches 1–5 and 2–5. Cancellation signals received when there are cuts present in switch 2–5 and ahead of switch 2–5 also require storage, as graphically represented in the seventh and eighth lines of FIG. 8. All four of these traffic conditions govern actuation of the auxiliary cancellation storage relay CSRZ (FIG. 5A) which controls storage of cancellation information.

Thus, whenever a cut is present in the first switch 1–5 in the controlled track section, as represented by the fifth and eighth lines in FIG. 8, the track relay 1TR (FIG. 6) is energized. Under these circumstances, contacts 1TR5 (FIG. 5A) are closed, completing an operating circuit to the coil CSRZ of the auxiliary cancel store relay. From the foregoing description, it will be clear that whenever there is a cut of cars present in the controlled track section between the track switches, the cut-between relay coil CBR is energized and is maintained energized until the cut leaves the controlled section. Consequently, for the operating conditions represented by the sixth and seventh lines of FIG. 8 the cut between relay contacts CBR5 (FIG. 5A) are closed. The storage detection relay SDR is de-energized whenever there is a cut of cars between the track switches 1–5 and 2–5 and there is also a cut in the second switch 2–5, so that relay coil CSRZ is energized through contacts SDR3 for the traffic condition illustrated in the seventh line of FIG. 8. With a cut between the switches, the energizing circuit extends through the contacts CBR5, 2TR8 and 1TR6.

Whenever coil CSRZ is energized, contacts CSRZ1 (FIG. 5) are opened. Consequently, the cancellation relay CRR upon operation by a remote cancel input signal, cannot energize cancellation storage relay CSR. Thus, energization of the stepping switch magnet 4SSM cannot be effected since contacts CSR1 remain open. Moreover, no cancellation signal is passed on at the time the cancellation relay coil CRR is energized because the cancel storage relay contacts CSR2 (FIG. 6) remain open.

When a remote cancellation signal is supplied to the cancellation relay coil CRR (FIG. 5) while coil CSRZ is energized, the consequent closing of contacts CRR3 in the operating circuit for the stepping switch magnet 1SSM (right center FIG. 6) energizes the stepping switch magnet. This is made possible because contacts CSRZ2 are already closed. At the same time, contacts CRR6 open to prevent actuation of the storage transfer relay coil STR. Referring again to FIG. 5, contacts CSRZ3 and CRR4 are closed and contacts CRR5 are opened upon energization of the cancel relay coil CRR for the traffic conditions under consideration. This completes an energizing circuit for one of the cancel position relays 1CPR to 5CPR; with the stepping switch 1SS starting in the position illustrated, an energizing circuit is completed to the relay 1CPR. Once energized, the storage relay is held energized through its own contacts.

When the cancellation signal received on line 79 is terminated, and the CRR relay drops out, the opening of contacts CRR3 (FIG. 6) breaks the operating circuit for the stepping switch solenoid 1SSM. As a consequence, stepping switch 1SS (FIG. 5) steps to its next position, leaving the cancellation information recorded in register 1CPR–5CPR.

(G) Readout of stored cancellation information

The recording of a cancellation command in the occupancy and cancel register 69 (FIG. 5) entails advance of stepping switch 1SS, as described above, without a corresponding advance of stepping switch 2SS.

Whenever one or more cancellation signals have been recorded in the register comprising relays 1CPR through 5CPR, the storage detection relay coil SDR is de-energized, since stepping switches 1SS and 2SS are out of step with each other. When a cut next enters the second track switch 2–5, following recording of a cancellation signal, stepping switch electromagnet 2SSM (FIG. 6) is energized by closing of track relay contacts 2TR3, contacts SDR2 being closed because coil SDR is de-energized. Contacts 2TR6 (FIG. 5) also close, energizing the cancel store relay coils CSR and CSRY from the V+ supply through a connection afforded by the holding circuit for the CPR relay that has been energized to store a cancel signal. The ground circuit for coil CSRY is completed through contacts 2SS1, which close upon energization of the stepping switch magnet 2SSM. Actuation of the auxiliary CSRY relay is delayed, due to the incorporation of capacitor 188 and resistor 187 in the circuit of coil CSRY. The opening of contacts 2TR8 de-energizes the other cancellation store relay CSRZ (FIG. 5A).

Energization of the cancel store relay coil CSR (FIG. 6). The closing of contacts CSR2 produces a cancellation signal that is transmitted to the next downstream control unit, either control unit C2–3 or unit C4–5, depending upon the operating condition of the future position storage relay PSR, as reflected in the operating conditions of contacts PSR3 and PSR4. Contacts CSR1 also close to establish an energizing circuit for the stepping switch electromagnet 4SSM. Contacts CSR3 open, preventing the closing of contacts CSR1 from applying a throw signal to switch machine S2–5 as represented in FIG. 6 by relay R2–5.

As noted above, the auxiliary cancel store relay CSRY (FIG. 5) pulls in a predetermined time interval after closing of track relay contacts 2TR6. When this occurs, contacts CSRY1 open, interrupting the operating circuit for the cancel store relay coil CSR. Contacts CSRY2 (FIG. 6) also open, de-energizing stepping switch magnet 2SSM. When the stepping switch magnet is de-energized, stepping switch 2SS (FIG. 5) advances one step.

Returning to FIG. 6, the opening of contacts CSR2 upon de-energization of the cancel store relay coil CSR terminates the cancellation signal supplied to modular control unit C2–3 or to unit C4–5. The opening of contacts CSR1 breaks the operating circuit for magnet 4SSM. Consequently, stepping switch 4SS (FIG. 4) advances one step, skipping one position in the route command storage register and thus effectively cancelling one recorded partial route command.

When more than one cancel signal has been stored in the CPR register 69, FIG. 5, stepping switch SS2 may be advanced more than one step. Thus, following pull-in of auxiliary cancel store relay CSRY and the resultant actions described above, if the next CPR relay to which wiper 150 steps is energized, the sequence of operations entailed in readout of stored cancellation information is automatically repeated. Cancellation readout goes forward for as many cancellation signals as have previously been stored in the CPR register.

(H) Clearing the route switching system

Clearing of previously recorded route command information from the route switching system is accomplished by closing electrical switch CL, FIG. 6, or by supplying a positive clearing signal to terminal 196 through the console system clear switch SCL along line 74. Under either circumstance, the clear panel relay coil KPR is energized and is held energized thereafter by closing of its contacts KPR4.

Upon energization of the clear panel relay, contacts KPR1 open, de-energizing both the occupancy relay coil OCR and the cut between relay coil CBR. Opening of contacts KPR1 also serves to de-energize stepping switch magnet 2SSM and throw order relay coil TOR. It should be noted that occupancy relay coil OCR and cut between relay coil CBR may remain energized through contacts 1TR2 if a cut is present in the first track switch 1–5, at least until the cut clears that track switch. Moreover, throw order relay coil TOR could remain energized through the circuits comprising its contacts TOR1.

Energization of the clear panel relay also closes clear panel contacts KPR2 and energizes magnet 1SSM, providing the SDR storage detection relay is de-energized and contacts SDR4 are closed, indicating that some cancellation or occupancy information has previously been stored in the cancel and occupancy register 1CPR–5CPR. When magnet 1SSM is energized, its contacts 1SS2 open, promptly de-energizing the magnet and advancing the stepping switch 1SS (FIG. 5) one step. The stepping process is repeated until stepping switch 1SS is aligned with its counterpart, switch 2SS, energizing coil SDR (FIG. 5) and opening contacts SDR4 to interrupt further stepping by preventing energization of magnet 1SSM.

Contacts KPR3 (FIG. 6) open, upon energization of the clear panel relay, preventing actuation of storage transfer relay coil STR as stepping switch 1SS steps around.

Contacts KPR4 (FIG. 6) of the clear panel relay close to maintain the clear panel relay energized during the time interval in which stepping switches 1SS and 2SS are brought into synchronization, as described above.

If the no storage relay coil NSR is energized at the time of actuation of the KPR relay, thereby indicating the storage of one or more route commands in register 1SSR–5SSR (FIG. 4), then contacts NSR3 (FIG. 6 lower left-hand corner) are closed. Accordingly, the closing of contacts KPR5 energizes stepping switch magnet 3SSM through a circuit including contacts NSR3 and 3SS1. Upon energization of magnet 3SSM, contacts 3SS1 open to de-energize the magnet and advance stepping switch 3SS one step. This process is repeated until stepping switch 3SS (FIG. 4) reaches a position of alignment with its companion switch 4SS, energizing the no storage relay coil NSR and thereby opening contacts NSR3 (FIG. 6). Once contacts NSR3 are open, the operating circuit for magnet 3SSM is interrupted and the stepping operation effected through the circuit comprising these contacts is halted. The connection through diode 216 and through contacts KPR4 maintains the clear panel relay KPR energized until the rout storage register is cleared even though clearing of the cancel and occupancy store may be completed at an earlier time.

When both storage registers have been cleared, contacts NSR3 and SDR4 (FIG. 6) are both open. Consequently, the KPR relay drops out and the system is ready for new routing and cancellation information. The same clearing operation is effected regardless of the source of the clearing signal, which may originate at switch CL or switch SCL.

(I) Indicator lamps

Lamp K1 (FIG. 6) indicates occupancy of the track section encompassing track switches 1–5 and 2–5. If it is desired to have the lamp K1 on the operator's console indicate only occupancy of track switch 2–5, then the lamp may be energized by an appropriate circuit through the occupancy detector D2–5 related to track switch 2–5.

As described above in connection with FIG. 1, lamps K5 and K6 indicate the present position of the track switch 2–5 that is actually controlled by modular control unit C2–5. When switch position relay coil SPR is de-energized, indicating that the track switch 2–5 is in its "normal" position, lamp K6 is energized through contacts SPR8 (FIG. 6). Conversely, when the switch machine is in its "reverse" position, coil SPR is energized and contacts SPR7 are closed so that indicator lamp K5 is energized.

Lamps K2 and K3 (FIG. 5) serve to indicate the position to which track switch 2–5 will be actuated in the next operating cycle of modular control unit C2–5. Thus, if the future position-of-switch relay PSR is de-energized, indicating that the next position of track switch 2–5 will be its "normal" position, then lamp K3 is energized through contacts PSR6. Conversely, if the PSR relay is energized to indicate that the next position for track switch 2–5 is a "reverse" position, lamp K2 is illuminated. It should be noted that the operating circuits for both of indicator lamps K2 and K3 extend through the relay contacts NSR4, preventing energization of either of the lamps whenever the no storage relay is energized, the latter condition indicating that there is no future route command information stored in the modular control unit. The lamps K2 and K3 are not shown on the operator's console 20 (FIG. 1); they may be located with the operating components of modular control unit C2–5.

(J) Manual operation of track switch 2–5

The foregoing description of modular control unit C2–5 is based upon operation of the route switching system with the automatic-manual switch AMS in its "automatic" position. Under some circumstances, it may be desirable to control the position of track switch 2–5 independently of the automatic system. To this end, switch AMS (see FIGS. 5 and 6) is thrown to its "manual" position. In FIG. 5, this opens the operating circuits for relay coils CSR and CSRY. In FIG. 6, actuation of switch AMS to the "manual" position completes a connection from the V+ supply through contacts 2TR7 to the normally open section of the throw switch THS. With switch AMS in its "manual" position, therefore, a throw signal can be applied to the switch machine represented in FIG. 6 by relay R2–5 by actuation of switch THS. It should be noted that contacts 2TR7 prevent the application of a throw signal to the switch machine when the track switch 2–5 is occupied, since these contacts are open whenever track relay 2TR is energized and indicates that a cut is present in the track switch.

(K) Transmission of control signals to retarder control unit RC

As can be seen from the block diagrams comprising FIGS. 2 and 3, the retarder control unit RC is actuated by control signals supplied thereto from modular control unit C2–5 and in accordance with retarder level information supplied from the main control unit 40 by retarder level logic transmission circuit 54. The other modular control units C4–5 and C2–3 do not actuate the retarder control unit.

Changes in retarder level are effected by transmission of the "throw" signal from circuit 199 in modular control unit C2–5 (see FIG. 6) to retarder control unit RC. Each time a throw signal is developed in circuit 199, as described in detail hereinabove, the retarder control unit is actuated by the same signal, supplied over line 77, to reset the retarder to an appropriate operating level in accordance with previously recorded information received from the main control unit 40. It should be noted that the actuating signal on line 77 is supplied to retarder control unit RC regardless of whether an actual throw operation is necessary with respect to switch machine S2–5, since the required level of retarder operation may vary independently of the necessity for changes in position of track switch 2–5.

The throw signal actuates retarder control unit RC to a new operating level only when a preceding cut clears the controlled track section governing operations of modular control unit C2–5 (or when the controlled track section is initially unoccupied), avoiding premature changes in retarder operating level.

Cancellation operations are initiated in the retarder control unit RC each time the cancel store relay coil CSR of modular control unit C2–5 is energized, by closing of contacts CSR4 connected to line 78 that is coupled to the retarder control unit. Similarly, actuation of the clearing relay coil SCR in modular control unit C2–5 opens contacts SCR2 and is effective to reset the retarder control unit RC whenever the track section encompassing switches 1–5 and 2–5 is clear of traffic.

Hence, while preferred embodiments of the invention have been described and illustrated, it is to be understood that they are capable of variation and modification.

We claim:

1. An automatic route switching system for a railroad classification yard, or the like, including a plurality of track switches for diverting vehicles along a series of routes diverging from a first track switch to specified destinations, said switching system comprising:

a main control unit, including main storage means for recording a number of complete route commands identifying individual routes to be traversed by the vehicles and further including readout means for reading out the stored route commands in sequence;

a plurality of modular control units, substantially similar in construction to each other, one for each track switch, for controlling operation of each switch in accordance with partial route commands relating to the controlled switch and further in accordance with the traffic conditions on a controlled route section encompassing the controlled switch and the immediately preceding switch;

each of said modular control units including local route command storage means for recording several partial route commands relating to operation of the switch controlled by said modular control units; and transmission means, included in said main control unit and coupling said readout means of said main control unit to each of said modular control units, for simultaneously transmitting partial route commands from said main control unit to all of the modular units affected by a given complete route command.

2. An automatic route switching system according to claim 1, including an occupancy detector for each of said track switches, and means coupling each modular control unit to the occupancy detector for the track switch controlled by that modular control unit and to the occupancy detector for the immediately preceding track switch to regulate storage and use of partial route commands received by said modular control unit in accordance with traffic conditions on the route section encompassed by the two switches.

3. An automatic route switching system according to claim 1, including an occupancy detector for said first track switch, and means coupling said occupancy detector to said transmission means to initiate simultaneous transmission of a plurality of partial route commands representative of a stored complete route command from said main control unit to said modulate control units whenever a vehicle enters said first track switch.

4. An automatic route switching system according to claim 1 in which each of said modular control units includes cancellation means for developing cancellation signals, cancel storage means for storing cancellation signals whenever at least one vehicle is present in the route section of said modular control unit ahead of the track switch controlled by said modular control unit or occupies that track switch, and means for applying said stored cancellation signals to said local storage means to cancel a previously recorded partial route command from said local storage means upon entry of a vehicle into the controlled track switch.

5. An automatic route switching system according to claim 4 and further including transmission means for transmitting said cancellation signals from each modular control unit to an immediately downstream modular control unit at the time of utilization of said cancellation signal, and means for selecting the downstream modular control unit to which said cancellation signal is transmitted in accordance with the partial route command cancelled.

6. A modular control unit for an automatic switching system according to claim 2, comprising:

a route command storage register for recording several partial route commands relating to operation of a track switch controlled by the modular control unit;

route command readout means, coupled to said storage register, for reading out route commands therefrom;

throw signal transmission means coupling said command readout means to said controlled track switch to actuate said switch; and occupancy logic means, coupled to the occupancy detectors for said controlled track switch and for the preceding switch, to said throw signal transmission means, and to said command readout means, for actuating said throw signal transmission means and said command readout means only under predetermined traffic conditions on the controlled route section encompassing both track switches.

7. A modular control unit for an automatic switching system according to claim 1, comprising:

a route command storage register for recording several partial route commands relating to operation of a track switch controlled by the modular control unit;

route command readout means, coupled to said storage register, for reading out route commands therefrom;

throw signal transmission means coupling said command readout means to said controlled track switch to actuate said switch;

occupancy logic means for actuating said throw signal transmission means and said command readout means only under predetermined traffic conditions on the route section encompassing both track switches;

cancellation means for developing cancellation signals;

a cancel storage register for storing said cancellation signals whenever at least one vehicle is present in the controlled track switch or in the route section ahead of the controlled track switch at the time said cancellation signals are developed;

cancel signal readout means, coupling said cancel storage register to said route command storage register, for reading out cancellation signals from said cancel storage register; and means for actuating said cancel store readout means to apply a stored cancellation signal to said route command storage register to cancel a stored partial route command therein upon entry of a vehicle into the controlled track switch.

8. A modular control unit according to claim 7 and further including two cancellation output circuits, each coupled to said cancel signal readout means, for transmitting cancellation signals to separate downstream modular control units in response to actuation of said cancel signal readout means, and means for selecting one of said output circuits in accordance with the partial route command cancelled.

9. A modular control unit for an automatic switching system according to claim 2, comprising:

a route command storage register for recording several partial route commands relating to operation of a track switch controlled by the modular control unit;

route command readout means, coupled to said storage register, for reading out route commands therefrom;

throw signal transmission means coupling said command readout means to said controlled track switch to actuate said switch;

cancellation means for developing cancellation signals;

a cancel store register for storing said cancellation signals whenever at least one vehicle is present in the controlled track switch or in the route section ahead of the controlled track switch at the time said cancellation signals are developed;

cancel signal readout means, coupling said cancel storage register to said route command storage register, for reading out cancellation signals from said cancel store register; and occupancy logic means, coupled to the occupancy detectors for said controlled track switch for the preceding switch, to said throw signal transmission means, to said command readout means, and to said cancel signal readout means, for actuating said throw signal transmission means, said cancel signal readout means and said command readout means only under predetermined traffic conditions on the controlled route section encompassing both track switches.

10. An automatic route switching system according to claim 1 in which each of said partial route commands comprises a single pulse signal applied to one of two inputs in a given modular control unit to indicate which of two given operating states is to be assumed by the track switch controlled by that unit.

11. An automatic route switching system according to claim 4 in which said cancel store means in each of said modular control units comprises a rotary stepping switch having a plurality of terminals and a storage relay connected to each terminal of said switch.

12. An automatic route switching system according to claim 1 including preset means, coupled to said transmission means, for establishing a given retarder operating level command for each of a plurality of vehicle destinations, and a retarder control unit including retarder level storage means for recording a series of retarder operating level commands, said transmission means being coupled to said retarder control unit to transmit a retarder operating level command thereto simultaneously with each transmission of partial route commands to the modular control units.

References Cited

UNITED STATES PATENTS

| | | | |
|---|---|---|---|
| 2,863,991 | 12/1958 | Mishelevich | 246—2 |
| 2,863,992 | 12/1958 | George et al. | 246—2 |
| 3,211,907 | 10/1965 | Blaisdell et al. | |

FOREIGN PATENTS

| | | |
|---|---|---|
| 380,798 | 6/1931 | Great Britain. |

ARTHUR L. LA POINT, Primary Examiner

G. LIBMAN, Assistant Examiner

U.S. Cl. X.R.

104—26